(12) United States Patent
Maeda et al.

(10) Patent No.: US 11,242,035 B2
(45) Date of Patent: Feb. 8, 2022

(54) DEVICE FOR CONTROLLING DEFOGGING UNIT OF VEHICLE

(71) Applicant: DENSO CORPORATION, Kariya (JP)

(72) Inventors: Kenichiro Maeda, Kariya (JP); Takuya Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 360 days.

(21) Appl. No.: 16/371,179

(22) Filed: Apr. 1, 2019

(65) Prior Publication Data

US 2019/0225189 A1 Jul. 25, 2019

Related U.S. Application Data

(63) Continuation of application No. PCT/JP2017/031605, filed on Sep. 1, 2017.

(30) Foreign Application Priority Data

Oct. 11, 2016 (JP) .............................. JP2016-200223
Feb. 13, 2017 (JP) .............................. JP2017-024338

(51) Int. Cl.
| | | |
|---|---|---|
| *B60S 1/02* | (2006.01) | |
| *B60S 1/56* | (2006.01) | |
| *B60H 1/00* | (2006.01) | |
| *B60H 1/32* | (2006.01) | |

(52) U.S. Cl.
CPC .......... *B60S 1/023* (2013.01); *B60H 1/00785* (2013.01); *B60H 1/00849* (2013.01); *B60H 1/3207* (2013.01); *B60S 1/56* (2013.01); *B60H 2001/3245* (2013.01)

(58) Field of Classification Search
CPC .............. B60H 1/00849; B60H 1/3207; B60H 1/00785; B60H 2001/3245; B60S 1/023; B60S 1/56
See application file for complete search history.

(56) References Cited

U.S. PATENT DOCUMENTS

| | | | | |
|---|---|---|---|---|
| 2006/0235615 A1* | 10/2006 | Kato | .................... | B62D 15/029 701/300 |
| 2011/0118939 A1* | 5/2011 | Kawamata | ............ | B60W 10/18 701/41 |
| 2015/0088374 A1 | 3/2015 | Yopp et al. | | |

FOREIGN PATENT DOCUMENTS

| | | |
|---|---|---|
| JP | 2001317957 A | 11/2001 |
| JP | 2004255946 A | 9/2004 |
| JP | 2016018238 A | 2/2016 |

* cited by examiner

*Primary Examiner* — Jessica Yuen
(74) *Attorney, Agent, or Firm* — Harness, Dickey & Pierce, P.L.C.

(57) ABSTRACT

A device controls a defogging unit of a vehicle to be driven in a driving mode corresponding to a self-driving degree indicating a degree of depending on a self-driving system for a driving operation, and the defogging unit defogs a window of the vehicle. The device includes: an identification unit that identifies the self-driving degree; and a control execution unit that controls the anti-fogging function exhibited by the defogging unit. The self-driving degree is defined as exhibiting a higher value as the degree of depending on the self-driving system for the driving operation is larger. When the self-driving degree identified by the identification unit is a second value higher than a first value, the control execution unit controls the anti-fogging function executed by the defogging unit to be lower than that when the self-driving degree identified by the identification unit is the first value.

14 Claims, 18 Drawing Sheets

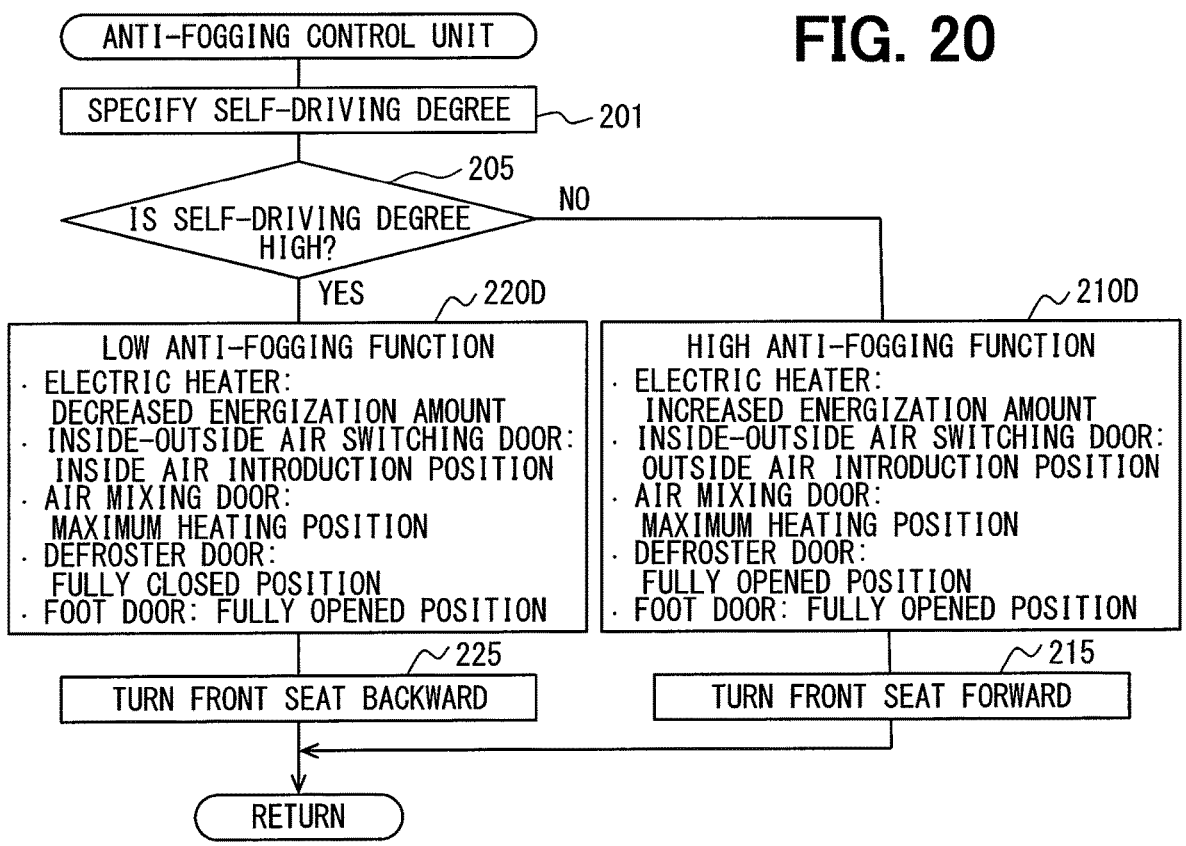

DEVICE FOR CONTROLLING DEFOGGING UNIT OF VEHICLE

CROSS REFERENCE TO RELATED APPLICATIONS

The present application is a continuation application of International Patent Application No. PCT/JP2017/031605 filed on Sep. 1, 2017, which designated the United States and claims the benefit of priority from Japanese Patent Application No. 2016-200223 filed on Oct. 11, 2016 and Japanese Patent Application No. 2017-024338 filed on Feb. 13, 2017. The entire disclosures of all of the above applications are incorporated herein by reference.

TECHNICAL FIELD

The present disclosure relates to a device for controlling a defogging unit of a vehicle.

BACKGROUND ART

In recent years, development of a self-driving vehicle capable of traveling automatically without a driving operation by a person (that is, an occupant or the like) has been advanced. For the practical application of a self-driving vehicle, a technique involved in a control such as switching of a driving mode (that is, switching between a manual driving mode and a self-driving mode) has been proposed.

SUMMARY

According to an aspect of the present disclosure, a device controls a defogging unit of a vehicle configured to be driven in a driving mode corresponding to a self-driving degree indicating a degree of depending on a self-driving system for a driving operation, and the defogging unit exhibits an anti-fogging function of a window of the vehicle. The device includes: an identification unit that identifies the self-driving degree; and a control execution unit that controls the anti-fogging function exhibited by the defogging unit. The self-driving degree is defined as exhibiting a higher value as the degree of depending on the self-driving system for the driving operation is larger. When the self-driving degree identified by the identification unit is a second value higher than a first value, the control execution unit controls the anti-fogging function executed by the defogging unit to be lower than that when the self-driving degree identified by the identification unit is the first value.

BRIEF DESCRIPTION OF DRAWINGS

FIG. 20 is a flowchart of processing executed by an anti-fogging control unit according to the fourth embodiment.

FIG. 21 is a functional configuration diagram of a vehicle control device according to a fifth embodiment.

DETAILED DESCRIPTION

Figure 1:
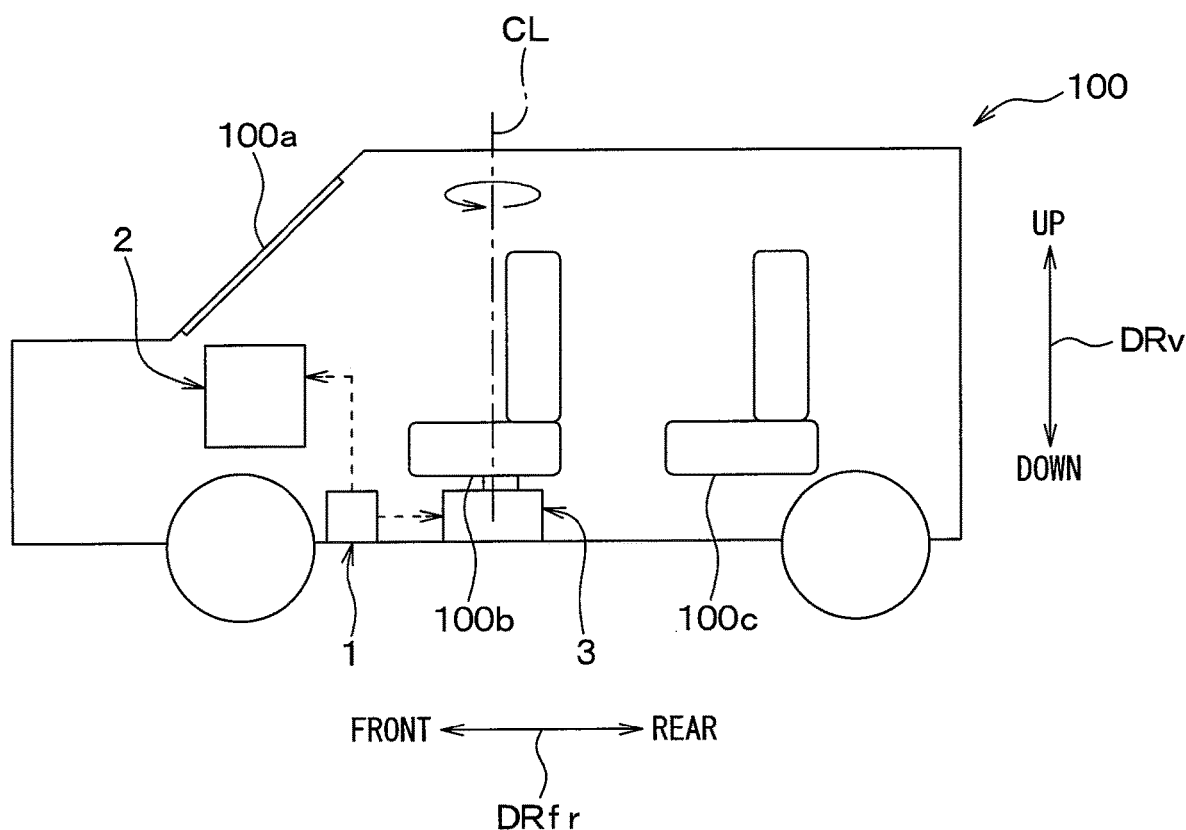
FIG. 1 is a schematic diagram showing an overall configuration of a self-driving vehicle controlled by a vehicle control device according to a first embodiment.

To begin with, examples of relevant techniques will be described.

For the practical application of a self-driving vehicle, a technique involved in a control such as switching of a driving mode (that is, switching between a manual driving mode and a self-driving mode) has been proposed.

The present inventors have actively promoted development focusing on a control of an anti-fogging function in a self-driving vehicle for commercialization of the self-driving vehicle. As a result, the following new issues have been found.

Conventionally, in a vehicle that requires a driving operation by an occupant, an anti-fogging device that exert the anti-fogging function to prevent windows of the vehicle such as a front windshield and side glasses from being fogged has been widely used. As the anti-fogging device, for example, a device that introduces a low-temperature and low-humidity outside air (that is, air of vehicle exterior) into a vehicle interior to prevent fogging, a device that operates a compressor of a refrigeration cycle to reduce the humidity of an inside air (that is, air in the vehicle interior) to prevent fogging, and the like have been used. The anti-fogging device described above typically begins to operate on the basis of occupant operation or begins to operate automatically on the basis of a temperature and a humidity.

In this example, the present inventors have noticed that the following events occur when the anti-fogging device exhibits the anti-fogging function. In other words, an energy for heating or cooling an air is basically required in order to exhibit the anti-fogging function of various anti-fogging devices. Therefore, if the anti-fogging device exhibits the anti-fogging function when not required, the energy is wastefully consumed.

Further, for example, in the case of an anti-fogging device that performs anti-fogging by warming a low-temperature air supplied from the outside and applying a resultant high-temperature air to the window, a face of the occupant or the like is warmed by the high-temperature air supplied, which may cause discomfort to the occupant.

In addition, for example, in the case of an anti-fogging device that performs anti-fogging by supplying a low humidity air supplied from the outside into the vehicle interior, a humidity in the vehicle interior is lowered by the low humidity air, so that pain and discomfort due to drying of a throat and eyes may be caused to the occupant.

As a result of examining the anti-fogging device used in the self-driving vehicle while paying attention to the phenomenon described above, the present inventors have considered that it is insufficient to simply apply the conventional antifogging device to the self-driving vehicle. Specifically, the present inventors have investigated a configuration and the like in which the anti-fogging function of the anti-fogging device is always exhibited not only in the manual driving mode but also in the self-driving mode, but have considered that such a configuration is insufficient. This is because, in the self-driving mode, even if the window is fogged and an appearance outside the vehicle cannot be visually recognized by the occupant, the vehicle can travel, and a need to actively perform the anti-fogging operation is low. This is because it may not be preferable in some cases to exhibit the anti-fogging function to cause the phenomenon described above even when not required.

The present disclosure provides a control device for appropriately controlling an anti-fogging function of a window in a self-driving vehicle in accordance with a self-driving degree, and a non-transitory computer-readable medium storing a program used for the control device.

According to an aspect of the present disclosure, a device controls a defogging unit of a vehicle configured to be able to be driven in a driving mode corresponding to a self-driving degree indicating a degree of depending on a self-driving system for a driving operation, and the defogging unit exhibits an anti-fogging function of a window of the vehicle. The device includes: an identification unit that identifies the self-driving degree; and a control execution unit that controls the anti-fogging function exhibited by the defogging unit.

The self-driving degree is defined as exhibiting a higher value as the degree of depending on the self-driving system for the driving operation is larger. When the self-driving degree identified by the identification unit is a second value higher than a first value, the control execution unit controls the anti-fogging function executed by the defogging unit to be lower than that when the self-driving degree identified by the identification unit is the first value.

According to another aspect of the present disclosure, a non-transitory computer-readable medium storing instructions for causing a computer to execute a process of controlling a defogging unit of a vehicle. The vehicle is configured to be driven in a driving mode corresponding to a self-driving degree indicating a degree of depending on a self-driving system for a driving operation. The defogging unit exhibits an anti-fogging function of a window of the vehicle. The self-driving degree is defined as exhibiting a higher value as the degree of depending on a self-driving system for the driving operation. The process includes: identifying the self-driving degree; and controlling the anti-fogging function to be lower than that when the self-driving degree is a first value, when the self-driving degree is a second value higher than the first value.

Accordingly, when the self-driving degree is relatively high, the anti-fogging function is controlled to be lower than that when the self-driving degree is relatively low. In other words, in the self-driving state in which the self-driving degree is high, the anti-fogging function of the window of the self-driving vehicle can be controlled in accordance with the self-driving degree by reducing the anti-fogging function. In other words, when a driving load of the driver is small, the anti-fogging function can be lowered.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Figure 2:
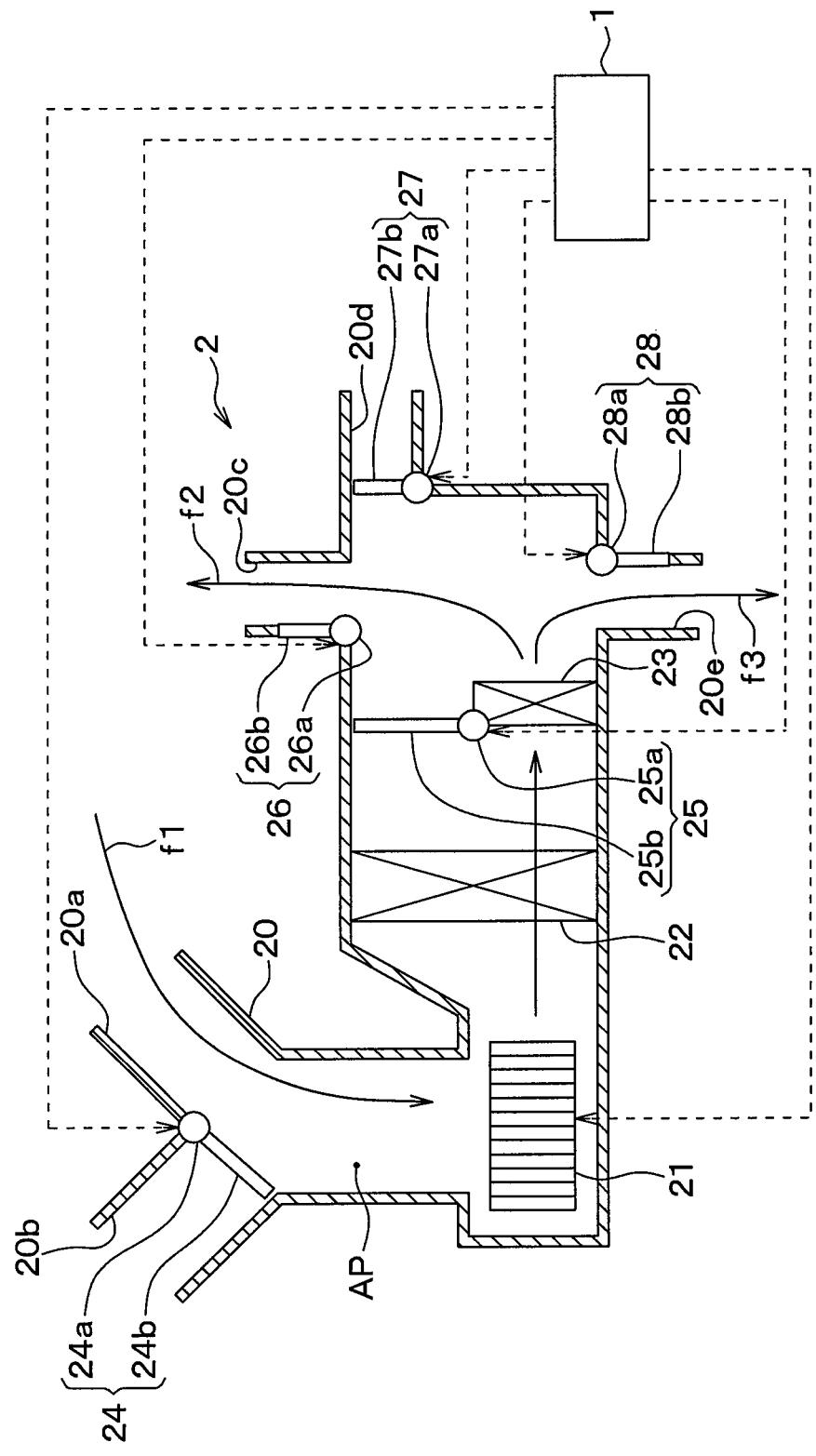
FIG. 2 is a schematic diagram showing an overall configuration of a vehicle air conditioner controlled by the vehicle control device according to the first embodiment.
Figure 3:
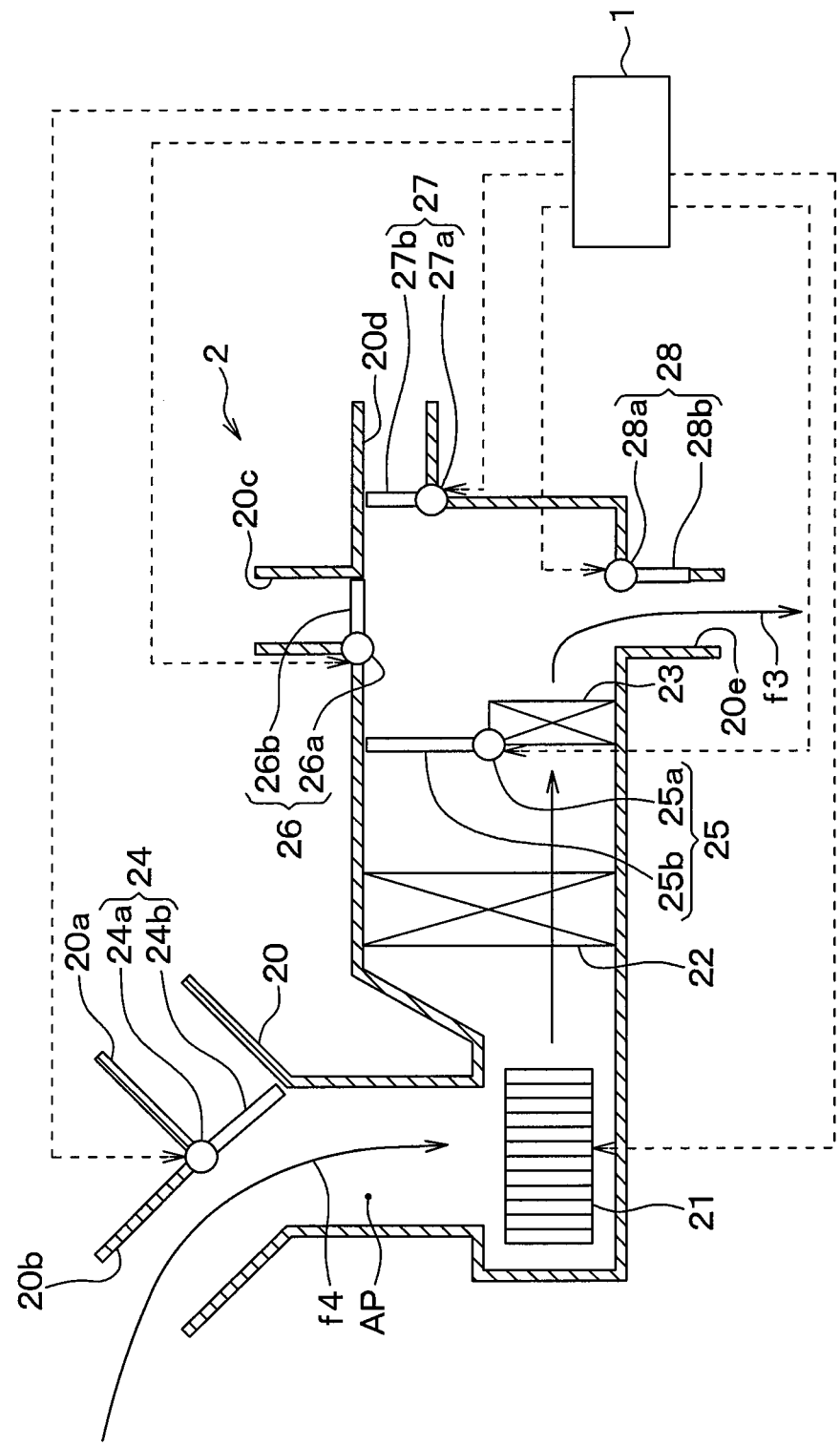
FIG. 3 is a schematic diagram showing another overall configuration of the vehicle air conditioner controlled by the vehicle control device according to the first embodiment.

A vehicle control device 1 and a vehicle control method according to a first embodiment of the present disclosure will be described with reference to FIGS. 1 to 6. As shown in FIG. 1, in the present embodiment, the vehicle control device 1 is applied to a self-driving vehicle 100 that can automatically travel without a human driving operation. The vehicle control device 1 according to the present embodiment performs switching control of a driving mode of the self-driving vehicle 100 in accordance with a self-driving degree. Details of the self-driving degree will be described later. In FIG. 1, an up-down direction of the self-driving vehicle 100 is indicated by an arrow DRv, and a front-rear direction of the self-driving vehicle 100 is indicated by a DRfr. Arrows f1 to f4 in FIGS. 2 and 3 schematically indicate an air flow. The same applies to drawings other than FIGS. 1 to 3.

In particular, the vehicle control device 1 according to the present embodiment controls a vehicle air conditioner 2. The vehicle air conditioner 2 is an air conditioner that generates air conditioning wind and provides the air conditioning wind into a vehicle interior. The vehicle air conditioner 2 introduces an air outside or inside the self-driving vehicle 100, warms the introduced air, and supplies the warmed air into the vehicle interior. For example, the vehicle air conditioner 2 supplies warmed air toward a window such as a front windshield 100a. The vehicle air conditioner 2 warms the front windshield 100a by supplying the warmed air into the vehicle interior, thereby preventing fogging of the front windshield 100a. In the present embodiment, the vehicle air conditioner 2 corresponds to a defogging unit which exhibits an anti-fogging function for preventing a window, (for example, the front windshield 100a) of the self-driving vehicle 100 from being fogged. In the present embodiment, the vehicle air conditioner 2 may be referred to as a defogging unit.

In the present embodiment, prior to a description of the vehicle control device 1, a configuration of the self-driving vehicle 100 which is an application target of the vehicle control device 1 and a configuration of the vehicle air conditioner 2 which is a control target of the vehicle control device 1 will be described.

The self-driving vehicle 100 is configured as a vehicle capable of switching between a manual driving mode in which the vehicle travels by a human driving operation, and a self-driving mode in which the vehicle travels automatically without the human driving operation. More specifically, the self-driving vehicle 100 is configured such that the driving mode is switched in accordance with a predetermined self-driving degree. The self-driving degree is a degree to which the driving operation depends on a self-driving system rather than a human. In other words, the self-driving vehicle 100 is configured to select a predetermined self-driving degree from multiple defined self-driving degrees and to be able to be driven in a driving mode corresponding to the selected self-driving degree. The switching control of the self-driving degree is mainly performed by the vehicle control device 1.

In the present embodiment, automation levels (that is, levels 0 to 4) defined by the Japanese authorities and the NHTSA (National Highway Traffic Safety Administration) are adopted as an example of the self-driving degree. Each level of the automation levels will be briefly described below. A level 0 is a level indicating a state in which a driver always operates all of main control systems. The main control systems include acceleration, steering, and braking. A level 1 is a level indicating a state in which the self-driving system performs any one of the acceleration, the steering, and the braking. A level 2 is a level indicating a state in which the self-driving system performs multiple operations among the acceleration, the steering, and the braking. A level 3 is a level indicating a state in which the self-driving system performs all of the acceleration, the steering, and the braking, and the driver responds to a request from the self-driving system. A level 4 is a level indicating a state in which other than the driver (that is, the self-driving system) performs all of the acceleration, the steering, and the braking, and the driver is not involved in the acceleration, the steering, and the braking at all. The self-driving degree according to the present embodiment is defined to be larger (that is, higher level) as the degree to which the driving operation depends on the self-driving system is larger.

The self-driving vehicle 100 includes a front windshield 100a, a front seat (for example, driver's seat) 100b, a rear seat 100c, and a vehicle air conditioner 2, as in the conventional vehicle. The front windshield 100a is a glass member that separates a vehicle interior from a vehicle exterior. At least a part of the front windshield 100a has transparency so that an occupant in the vehicle interior can visually recognize the vehicle exterior. The front windshield 100a is disposed on a front side of the front seat 100b in the front-rear direction DRfr of the self-driving vehicle 100.

The front seat 100b is a foremost seat disposed at a most anterior portion in the front-rear direction DRfr of the self-driving vehicle 100, of the multiple seats 100b and 100c installed in the vehicle interior. The front seat 100b is configured to be rotatable about the up-down direction DRv of the self-driving vehicle 100.

A seat rotation device 3 for rotating the front seat 100b with a direction extending along the up-down direction DRv of the self-driving vehicle 100 as an axis CL is disposed below the front seat 100b. The seat rotation device 3 rotates the front seat 100b in response to a control signal from the vehicle control device 1. The seat rotation device 3 is configuration to be switchable between a forward state in which an occupant seated in the front seat 100b faces a front side in the front-rear direction DRfr and a rearward state in which the occupant seated in the front seat 100b faces a rear side in the front-rear direction DRfr. When the driving mode of the self-driving vehicle 100 is the manual driving mode, the seat rotation device 3 rotates the front seat 100b so that the seated occupant faces the front side in the front-rear direction DRfr, as shown in FIG. 1.

The vehicle air conditioner 2 is an air conditioner that warms an introduced outside air (that is, vehicle exterior air) or an inside air (that is, vehicle interior air) to a predetermined temperature (that is, a warming target temperature) and then supplies the warmed air to the vehicle interior. As shown in FIGS. 2 and 3, the vehicle air conditioner 2 includes a case 20, a blower 21, a refrigeration cycle (not shown) including an evaporator 22, a heater core 23, an inside-outside air switching door 24, an air mixture door 25, a defroster door 26, a face door 27, and a foot door 28.

The case 20 is a housing member made of resin. As shown in FIG. 2, the case 20 is formed with an outside air introduction port 20a for introducing the outside air and an inside air introduction port 20b for introducing the inside air. In the case 20, a defroster blowing port 20c for blowing out air conditioning wind is provided on a vehicle interior side surface of the front windshield 100a. Further, the case 20 is formed with a face blowing port 20d for blowing out the air conditioning wind toward an upper space in the vehicle interior (that is, toward an upper body of the occupant). The case 20 is formed with a foot blowing port 20e for blowing out the air conditioning wind toward a lower space in the vehicle interior (that is, toward a lower body of the occupant). The case 20 is formed with an air passage AP for passing an air introduced from the outside air introduction port 20a or the inside air introduction port 20b to any of the defroster blowing port 20c, the face blowing port 20d, and the foot blowing port 20e.

The blower 21 generates air conditioning wind to be blown out from any of the defroster blowing port 20c, the face blowing port 20d, and the foot blowing port 20e into the vehicle interior. As shown in FIG. 2, the blower 21 includes a fan and an electric motor (not shown) for driving the fan. The blower 21 introduces the air from the outside air introduction port 20a or the inside air introduction port 20b, and generates an air for blowing out the introduced air into the vehicle interior from any of the defroster blowing port 20c, the face blowing port 20d, and the foot blowing port 20e.

The evaporator 22 is a heat exchanger that cools and dehumidifies the air generated by the blower 21 by evaporation of a refrigerant. The evaporator 22 is disposed in the air passage AP as shown in FIG. 2, and configures a refrigeration cycle (not shown) together with a compressor, a condenser, a decompressor, and the like (not shown).

The heater core 23 is a heat exchanger that heats the air (that is, cold air) passing through the evaporator 22 with an engine coolant water (that is, hot water). As shown in FIG. 2, the heater core 23 is disposed on a downstream side of the air flow of the evaporator 22 in the air passage AP.

The inside-outside air switching door 24 is a door member for adjusting the amount of outside air introduced from the outside air introduction port 20a and the amount of inside air introduced from the inside air introduction port 20b. As shown in FIG. 2, the inside-outside air switching door 24 has a rotation shaft 24a and a flat plate portion 24b which rotates with the rotation of the rotation shaft 24a. The inside-outside air switching door 24 is driven by a motor (not shown), and the flat plate portion 24b rotates about the rotation shaft 24a, thereby adjusting the amount of outside air introduced from the outside air introduction port 20a and the amount of inside air introduced from the inside air introduction port 20b.

In the present embodiment, since the flat plate portion 24b is rotated toward the inside air introduction port 20b as shown in FIG. 2, a ratio of the amount of the outside air introduced from the outside air introduction port 20a to the amount of the inside air introduced from the inside air introduction port 20b becomes large. Hereinafter, the ratio of the amount of the outside air to the amount of the inside air introduced from the inside air introduction port 20b is referred to as an inside and outside air ratio.

As described above, the greater the rotation of the flat plate portion 24b toward the inside air introduction port 20b, the greater the ratio of the amount of the outside air introduced from the outside air introduction port 20a, and the smaller the ratio of the amount of the inside air introduced from the inside air introduction port 20b. In other words, the ratio of the inside air and outside air becomes large.

Conversely, when the flat plate portion 24b is rotated toward the outside air introduction port 20a as shown in FIG. 3, a ratio of the amount of the inside air introduced from the inside air introduction port 20b to the amount of the outside air introduced from the outside air introduction port 20a is increased. In other words, the ratio of the inside air and outside air becomes small.

In other words, the greater the rotation of the flat plate portion 24b toward the outside air introduction port 20a, the greater the ratio of the amount of the inside air introduced from the inside air introduction port 20b, and the smaller the ratio of the amount of the outside air introduced from the outside air introduction port 20a. The inside-outside air switching door 24 is disposed on the upstream side of the air flow of the blower 21 in the air passage AP. As described above, the vehicle air conditioner 2 has the inside-outside air switching door 24, thereby making the ratio of the inside-outside air variable.

The inside-outside air switching door 24 is configured to be able to be set to a position in which the inside air introduction port 20b is fully closed and the outside air introduction port 20a is fully opened (that is, an outside air introduction position), and a position in which the outside air introduction port 20a is fully closed and the inside air introduction port 20b is fully opened (that is, an inside air introduction position). The inside-outside air switching door 24 is also configured to be able to be set to a position at which both of the outside air introduction port 20a and the inside air introduction port 20b are opened (that is, an intermediate opening position).

The air mixture door 25 is a door member for adjusting the amount of air passing through a passage of the air passage AP on the side where the heater core 23 is disposed, among the cold air passing through the evaporator 22, and the amount of air passing through a passage of the air passage AP on the side where the heater core 23 is not disposed. Hereinafter, a passage of the air passing through the evaporator 22 on the side where the heater core 23 is disposed in the air passage AP is referred to as a main passage, and a passage of the air passage AP on the side where the heater core 23 is not disposed is referred to as a bypass passage.

As shown in FIG. 2, the air mixture door 25 has a rotation shaft 25a and a flat plate portion 25b that rotates with the rotation of the rotation shaft 25a. The air mixture door 25 is driven by a motor (not shown), and the flat plate portion 25b rotates about the rotation shaft 25a to adjust the amount of air passing through the main passage and the amount of air passing through the bypass passage.

In the present embodiment, since the flat plate portion 25b is rotated toward the main passage, the ratio of the amount of air passing through the bypass passage to the amount of air passing through the main passage is increased. In other words, the greater the rotation of the flat plate portion 25b toward the main passage, the greater the ratio of the amount of air passing through the bypass passage, and the smaller the ratio of the amount of air passing through the main passage. Conversely, when the flat plate portion 25b is rotated to the bypass passage side as shown in FIG. 2, the ratio of the amount of air passing through the main passage to the amount of air passing through the bypass passage is increased. In other words, the greater the rotation of the flat plate portion 25b toward the bypass passage, the greater the ratio of the amount of air passing through the main passage, and the smaller the ratio of the amount of air passing through the bypass passage. The air mixture door 25 is disposed on the air flow upstream side of the heater core 23 in the air passage AP.

The air mixture door 25 is configured to be able to be set to a position where the bypass passage is fully closed and the main passage is fully opened (that is, a maximum heating position), and a position where the main passage is fully closed and the bypass passage is fully opened (that is, a maximum cooling position). The air mixture door 25 is also configured to be able to be set at a position at which both of the main passage and the bypass passage are opened, that is, at an intermediate opening position.

The defroster door 26 is a door member for adjusting the amount of air blown out from the defroster blowing port 20c, of the cold air that has passed through the evaporator 22 or the warm air that has passed through the heater core 23. As shown in FIG. 2, the defroster door 26 has a rotation shaft 26a and a flat plate portion 26b that rotates with the rotation of the rotation shaft 26a. The defroster door 26 is driven by a motor (not shown), and the flat plate portion 26b rotates about the rotation shaft 26a, thereby adjusting the amount of air blown out from the defroster blowing port 20c. The defroster door 26 is disposed on the downstream side of the air flow of the evaporator 22 and the heater core 23 in the air passage AP.

The defroster door 26 is configured to be set to a fully closed position at which the defroster blowing port 20c is fully closed, a fully opened position at which the defroster blowing port 20c is fully opened, and an intermediate opening position at which the defroster blowing port 20c is slightly opened.

The face door 27 is a door member for adjusting the amount of air blown out from the face blowing port 20d, of the cold air that has passed through the evaporator 22 or the warm air that has passed through the heater core 23. As shown in FIG. 2, the face door 27 has a rotation shaft 27a and a flat plate portion 27b which rotates in accordance with the rotation of the rotation shaft 27a. The face door 27 is driven by a motor (not shown), and adjusts the amount of air blown out from the face blowing port 20d by rotating the flat plate portion 27b about the rotation shaft 27a. The face door 27 is disposed on the downstream side of the air flow of the evaporator 22 and the heater core 23 in the air passage AP. The face door 27 is configured to be set to a fully closed position at which the face blowing port 20d is fully closed and a fully opened position at which the face blowing port 20d is fully opened.

The foot door 28 is a door member for adjusting the amount of air blown out from the foot blowing port 20e, of the cold air that has passed through the evaporator 22 or the warm air that has passed through the heater core 23. As shown in FIG. 2, the foot door 28 has a rotation shaft 28a, and a flat plate portion 28b which rotates in accordance with the rotation of the rotation shaft 28a. The foot door 28 is driven by a motor (not shown), and the flat plate portion 28b rotates about the rotation shaft 28a, thereby adjusting the amount of air blown out from the foot blowing port 20e. The foot door 28 is disposed on the air flow downstream side of the evaporator 22 and the heater core 23 in the air passage AP. The foot door 28 is configured to be able to be set at a fully closed position at which the foot blowing port 20e is fully closed and at a fully opened position at which the foot blowing port 20e is fully opened.

In the vehicle air conditioner 2 having the above-described configuration, for example, in winter, the outside air or the inside air is introduced, the introduced air is warmed by the heater core 23, and then blown out from the defroster blowing port 20c into the vehicle interior, thereby warming the front windshield 100a. As a result, the vehicle air conditioner 2 exhibits the anti-fogging function.

The vehicle control device 1 according to the present embodiment controls the vehicle air conditioner 2 as follows, thereby exhibiting the anti-fogging function of the vehicle air conditioner 2. In other words, the vehicle control device 1 controls the position of the flat plate portion 24b of the air mixture door 25 so that the ratio of the amount of air passing through the main passage becomes large. In addition, the vehicle control device 1 controls the position of the flat plate portion 26b of the defroster door 26 so that the amount of air blown out from the defroster blowing port 20c becomes large. By performing such control, the vehicle air conditioner 2 cools and dehumidifies the outside air introduced from the outside air introduction port 20a or the inside air introduced from the inside air introduction port 20b by the evaporator 22. The vehicle air conditioner 2 warms the cooled and dehumidified air by the heater core 23, and blows the warm air warmed by the heater core 23 from the defroster blowing port 20c into the vehicle interior. As a result, the vehicle air conditioner 2 warms the front windshield 100a and performs the anti-fogging.

The configurations of the self-driving vehicle 100 and the vehicle air conditioner 2 have been described above.

Next, the configuration of the vehicle control device 1 according to the present embodiment will be described with reference to FIG. 4. The vehicle control device 1 is configured as a computer including a CPU, a RAM, a ROM, an I/O, and the like. The RAM and the ROM are non-transitory tangible storage media. The CPU performs various types of processing (for example, the processing of FIG. 5) in accordance with a program stored in the ROM.

Figure 4:
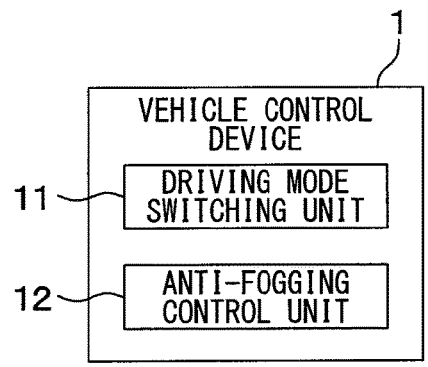
FIG. 4 is a functional configuration diagram of the vehicle control device according to the first embodiment.

As the CPU realizes various processes in this manner, the vehicle control device 1 functions as the driving mode switching unit 11 while functioning as the anti-fogging control unit 12, as shown in FIG. 4.

The driving mode switching unit 11 switches the self-driving degree of the self-driving vehicle 100 by a well-known method based on various well-known sensors. For example, the vehicle control device 1 selects the self-driving degree based on the operation of the occupant of the vehicle. The self-driving vehicle 100 travels in a mode for realizing the self-driving degree selected by the vehicle control device 1.

The anti-fogging control unit 12 outputs a signal to the vehicle air conditioner 2 configuring the defogging unit to control the anti-fogging function of the defogging unit. The anti-fogging control unit 12 outputs a signal to the seat rotation device 3 of the front seat 100b to control the rotational position of the front seat 100b.

The anti-fogging control unit 12 controls the vehicle air conditioner 2 as follows. As a situation in which the following control is performed, it is assumed that the outside air has a temperature lower than a reference temperature and a humidity lower than a reference humidity, and the temperature in the vehicle interior has a temperature higher than the temperature of the outside air (for example, in winter).

Figure 5:
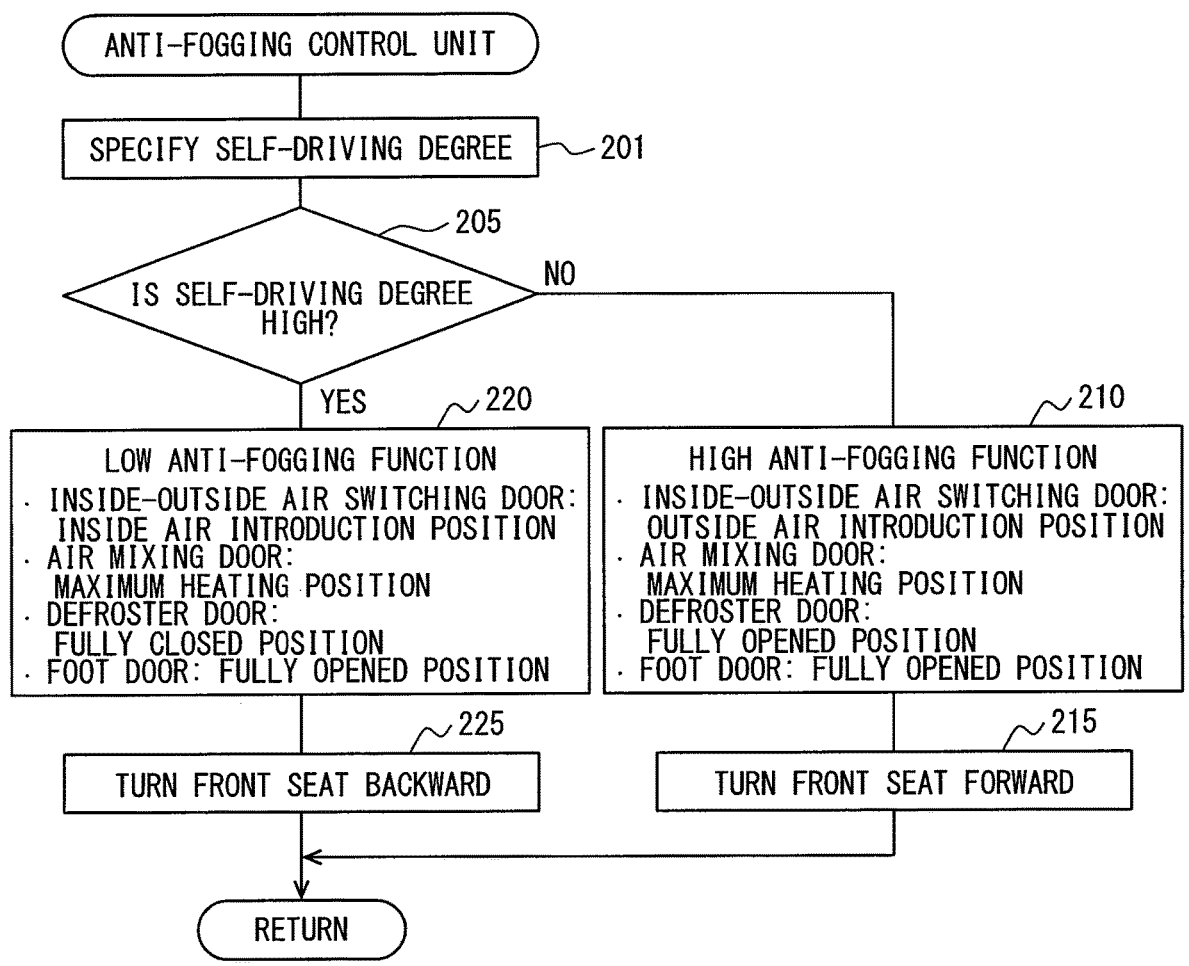
FIG. 5 is a flowchart of processing executed by an anti-fogging control unit according to the first embodiment.

The anti-fogging control unit 12 executes the processing shown in FIG. 5. First, in Step 201, the anti-fogging control unit 12 identifies the self-driving degree currently selected by the driving mode switching unit 11. Next, in Step 205, the anti-fogging control unit 12 determines whether or not the self-driving degree currently selected by the driving mode switching unit 11 is high. For example, when the automation level currently selected by the driving mode switching unit 11 is any one of 0, 1, 2, and 3, the anti-fogging control unit 12 determines that the self-driving degree is low. When the automation level currently selected by the driving mode switching unit 11 is 4, the anti-fogging control unit 12 determines that the self-driving degree is high.

When the self-driving degree is set to be low, since the driving operation of the driver is necessary, the anti-fogging control unit 12 proceeds from Step 205 to Step 210. In Step 210, the anti-fogging control unit 12 controls the vehicle air conditioner 2 so that the anti-fogging function is sufficiently high.

Specifically, in Step 210, the anti-fogging control unit 12 controls the inside-outside air switching door 24 so that the ratio of the amount of outside air introduced from the outside air introduction port 20a becomes large by rotating the flat plate portion 24b largely toward the inside air introduction port 20b, as shown in FIG. 2. In particular, the anti-fogging control unit 12 according to the present embodiment controls the inside-outside air switching door 24 so that the amount of outside air introduced from the outside air introduction port 20a is maximized and the ratio of the amount of inside air introduced from the inside air introduction port 20b is minimized. In other words, in Step 210, the anti-fogging control unit 12 according to the present embodiment controls the inside-outside air switching door 24 so that the position of the flat plate portion 24b becomes the outside air introduction position. As a result, the ratio of the inside air to the outside air is maximized, and a large amount of low-temperature and low-humidity outside air is introduced into the vehicle air conditioner 2.

Further, in Step 210, the anti-fogging control unit 12 controls the air mixture door 25 so that the ratio of the amount of air passing through the main passage is increased by rotating the flat plate portion 25b to the bypass passage side to a large extent as shown in FIG. 2. In particular, the anti-fogging control unit 12 according to the present embodiment controls the air mixture door 25 so that the amount of air passing through the main passage is maximized and the ratio of the amount of air passing through the bypass passage is minimized. In other words, in Step 210, the anti-fogging control unit 12 according to the present embodiment controls the air mixture door 25 so that the location of the flat plate portion 25b becomes the maximum heating position. As a result, the low-temperature and low-humidity outside air introduced into the vehicle air conditioner 2 is warmed to provide high-temperature and low-humidity air conditioning wind.

In Step 210, the anti-fogging control unit 12 controls the defroster door 26 so that the amount of air blown out from the defroster blowing port 20c increases by rotating the flat plate portion 26b, as shown in FIG. 2. In particular, the anti-fogging control unit 12 according to the present embodiment controls the defroster door 26 so that the amount of air blown out from the defroster blowing port 20c becomes maximum. That is, in Step 210, the anti-fogging control unit 12 according to the present embodiment controls the defroster door 26 so that the position of the flat plate portion 26b becomes the fully opened position. As a result, the high-temperature and low-humidity air conditioning wind is blown out toward the vehicle interior side surface of the front windshield 100a.

Further, in Step 210, the anti-fogging control unit 12 controls the foot door 28 so that the amount of air blown out from the foot blowing port 20e is increased by rotating the flat plate portion 28b, as shown in FIG. 2. In particular, the anti-fogging control unit 12 according to the present embodiment controls the foot door 28 so that the amount of air blown out from the foot blowing port 20e is maximized. In other words, in Step 210, the anti-fogging control unit 12 according to the present embodiment controls the foot door 28 so that the position of the flat plate portion 28b becomes the fully opened position. As a result, the high-temperature and low-humidity air conditioning wind is blown out toward a space on the lower side of the vehicle interior.

As described above, when the self-driving degree is low, the anti-fogging control unit 12 controls the vehicle air conditioner 2 so that the anti-fogging function is sufficiently exhibited. This anti-fogging function reduces fogging of the vehicle interior side surface of the front windshield 100a, so that the driver can visually recognize a state in the vehicle traveling direction and can safely execute the driving operation. In the present embodiment, the self-driving vehicle 100 may be configured so that the anti-fogging function can be stopped by the operation of the occupant or the like even when the self-driving degree is low.

On the other hand, when the self-driving degree is set to be high, since the driving operation of the driver is unnecessary, the anti-fogging control unit 12 proceeds from Step 205 to Step 220. Then, in Step 220, the anti-fogging control unit 12 controls the vehicle air conditioner 2 so as to lower the anti-fogging function than that in the case of Step 210.

Specifically, in Step 220, the anti-fogging control unit 12 controls the inside-outside air switching door 24 so that the ratio of the amount of outside air introduced from the outside air introduction port 20a becomes small by rotating the flat plate portion 24b largely toward the outside air introduction port 20a, as shown in FIG. 3. In particular, the anti-fogging control unit 12 according to the present embodiment controls the inside-outside air switching door 24 such that the amount of outside air introduced from the outside air introduction port 20a is minimum and the ratio of the amount of inside air introduced from the inside air introduction port 20b is maximum. In other words, in Step 220, the anti-fogging control unit 12 according to the present embodiment controls the inside-outside air switching door 24 so that the position of the flat plate portion 24b becomes the inside air introduction position. As a result, the ratio of the inside air and outside air becomes minimum, and the low-temperature and low-humidity outside air is less likely to be introduced into the vehicle air conditioner 2, and the high humidity inside air is likely to be introduced into the vehicle air conditioner 2.

Further, in Step 220, as shown in FIG. 3, the anti-fogging control unit 12 controls the air mixture door 25 such that the ratio of the amount of air passing through the bypass passage is reduced by largely rotating the flat plate portion 25b toward the bypass passage in the vehicle control device 1. In particular, the anti-fogging control unit 12 according to the present embodiment controls the air mixture door 25 so that the amount of air passing through the main passage is maximized and the ratio of the amount of air passing through the bypass passage is minimized. In other words, in Step 220, the anti-fogging control unit 12 according to the present embodiment controls the air mixture door 25 so that the position of the flat plate portion 25b becomes the maximum heating position. In the present embodiment, since the inside air having a higher temperature than that of the outside air flows into the heater core 23, the energy consumption amount of the heater core 23 required for heating the air introduced into the vehicle air conditioner 2 is reduced.

In Step 220, as shown in FIG. 3, the anti-fogging control unit 12 controls the defroster door 26 such that the amount of air blown out from the defroster blowing port 20c is reduced by rotating the flat plate portion 26b in the vehicle control device 1. In particular, the anti-fogging control unit 12 according to the present embodiment controls the defroster door 26 so that the amount of air blown out from the defroster blowing port 20c is minimized. In other words, in Step 220, the anti-fogging control unit 12 according to the present embodiment controls the defroster door 26 so that the position of the flat plate portion 26b becomes the fully closed position. As a result, the air conditioning wind is not blown out toward the vehicle interior side surface of the front windshield 100a.

Further, in Step 220, the anti-fogging control unit 12 keeps the foot door 28 in a state in which the amount of air blown out from the foot blowing port 20e becomes large, as shown in FIG. 3. In other words, in Step 210, the anti-fogging control unit 12 according to the present embodiment controls the foot door 28 so that the position of the flat plate portion 28b becomes the fully opened position. For that reason, the high-temperature and high-humidity air conditioning wind is blown out toward the space on the lower side of the vehicle interior.

As described above, the anti-fogging control unit 12 controls the vehicle air conditioner 2 so as not to exhibit the anti-fogging function when the self-driving degree has been changed to be set to be high. Since the vehicle air conditioner 2 is controlled so as not to exhibit the anti-fogging function in this manner, the low-temperature outside air is not brought to a high temperature by the heater core 23, and therefore, an energy necessary for the high temperature is not consumed. In other words, an adverse effect of wasteful energy consumption can be prevented. In addition, an adverse effect of causing discomfort to the occupant can be prevented by warming the face of the occupant or the like by the high-temperature air supplied from the defroster blowing port 20c to the vehicle interior. In addition, the humidity in the vehicle interior is lowered by the low-humidity air, thereby being capable of preventing an adverse effect that pain or discomfort due to drying of the throat or eyes is caused to the occupant.

As a matter of course, when the self-driving degree has been changed to be set to be high, fogging of the front windshield 100a may occur because the anti-fogging function of the vehicle air conditioner 2 is not exhibited. However, in a state in which the self-driving degree is high, the vehicle can safely travel even if the driver cannot visually recognize the state in the vehicle traveling direction. In the present embodiment, the self-driving vehicle 100 may be configured to exhibit the anti-fogging function by the operate of the occupant or the like even when the self-driving degree is high.

Figure 6:
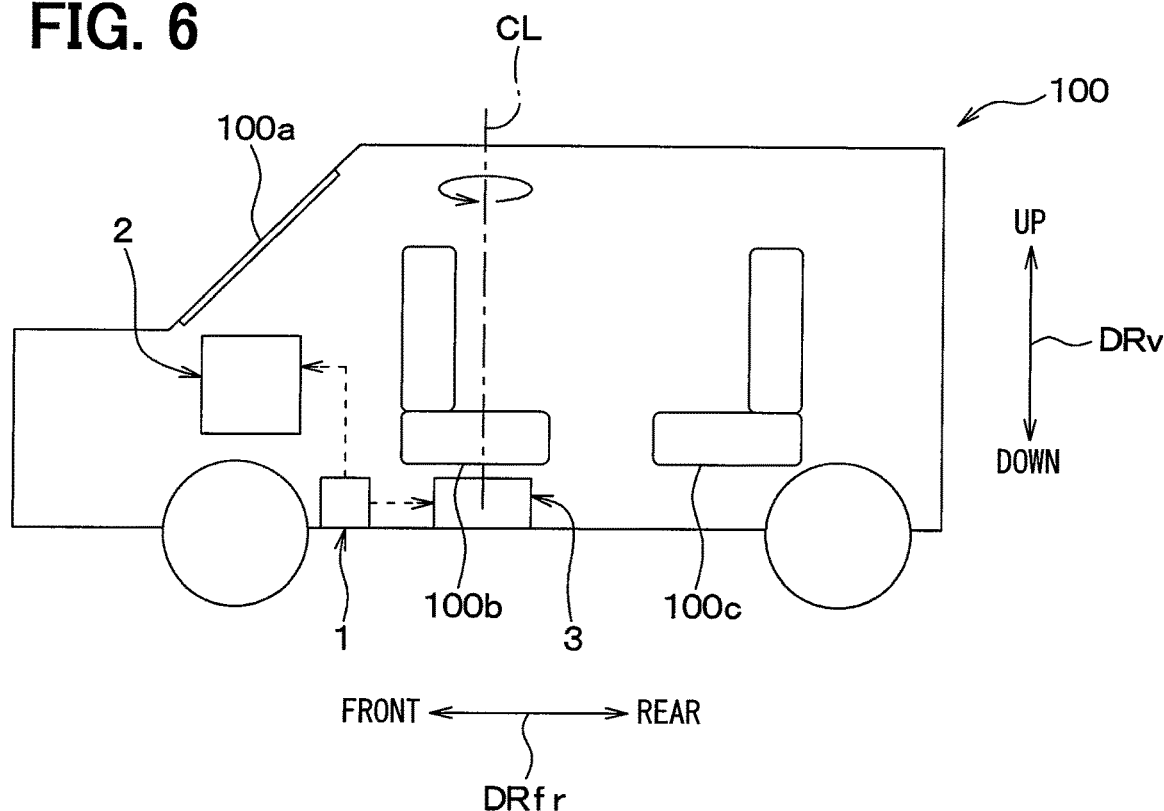
FIG. 6 is a schematic diagram showing another overall configuration of the self-driving vehicle controlled by the vehicle control device according to the first embodiment.

In Step 225 subsequent to Step 220, the anti-fogging control unit 12 controls the seat rotation device 3 so that the front seat 100b faces backward. As a result, the orientation of the front seat 100b is adjusted such that the occupant (that is, the driver) seated in the front seat 100b faces the rear side of the front-rear direction DRfr. For example, if the front seat 100b is in a posture such that the driver faces the front side in the front-rear direction DRfr, the seat rotation device 3 rotates the front seat 100b with the up-down direction DRv as the axis CL. As a result, as shown in FIG. 6, the front seat 100b rotates so that the occupant (that is, the driver) seated in the front seat 100b faces the rear side in the front-rear direction DRfr. With the rotation of the front seat 100b in this manner, the occupant seated on the front seat 100b can be prevented from feeling discomfort by visually recognizing the front windshield 100a fogged by lowering the anti-fogging function.

At this time, the occupant seated in the rear seat 100c remains facing the front side in the front-rear direction DRfr, but is farther away from the front windshield 100a than the front seat 100b, so that the discomfort caused by visually recognizing the fogged windshield 100a is small. In addition, since the occupant seated in the rear seat 100c faces the occupant seated in the front seat 100b, those occupants have a conversation with each other so as to be able to comfortably spend time without feeling discomfort even if those occupants visually recognize the fogged front windshield 100a. A rotation angle of the front seat 100b in Step 225 may be, for example, 90° to 270°, particularly preferably 180°.

After Step 225, the anti-fogging control unit 12 returns to Step 201. While the self-driving degree is continuously set to be high, the anti-fogging control unit 12 repeats the execution of Steps 201, 205, 220, and 225 in the stated order.

Thereafter, when the self-driving degree is changed from a high value to a low value, the driving operation of the driver is required. In that case, the anti-fogging control unit 12 proceeds from Step 205 to Step 210, and controls the vehicle air conditioner 2 so that the anti-fogging function is made higher than that in the case of Step 220, as described above.

Then, the anti-fogging control unit 12 proceeds from Step 210 to Step 215, and controls the seat rotation device 3 so that the front seat 100b faces forward. As a result, the orientation of the front seat 100b is adjusted so that the occupant seated in the front seat 100b faces the front side in the front-rear direction DRfr. The rotation angle of the front seat 100b in Step 215 may be, for example, 90 to 270 degrees, and particularly preferably 180 degrees.

After Step 215, the anti-fogging control unit 12 returns to Step 201. While the self-driving degree is continuously set to be low, the anti-fogging control unit 12 repeats the execution of Steps 201, 205, 210, and 215 in the stated order.

Thereafter, when the self-driving degree has been changed from the low value to the high value, the anti-fogging control unit 12 proceeds from Step 205 to Step 220, and controls the vehicle air conditioner 2 so that the anti-fogging function is lower than that in the case of Step 210, as described above. Further, the anti-fogging control unit 12 controls the seat rotation device 3 so that the front seat 100b faces backward in Step 225.

A timing of the above-mentioned control of the defogging unit (that is, the vehicle air conditioner 2) by the vehicle control device 1 when the setting of the self-driving degree has been changed is not particularly limited, but it is preferable that the timing is as early as possible after the setting change has occurred. The timing of the control of the front seat 100b by the vehicle control device 1 when the setting of the self-driving degree has been changed is also not particularly limited, but it is preferable that the timing is as early as possible after the setting has been changed.

As described above, the vehicle control device 1 and the program used in the vehicle control device 1 according to the present embodiment control the defogging unit so that the anti-fogging function is lower when the self-driving degree is the second value than when the self-driving degree is the predetermined first value. In this example, the first value is, for example, a value corresponding to the case where the automation level is any one of 0, 1, 2, and 3. The second value is, for example, a value corresponding to the case where the automation level is 4. Therefore, the second value is higher than the first value.

For that reason, according to the vehicle control device 1 of the present embodiment, when the self-driving degree is relatively high, the anti-fogging function is controlled to be lower than that when the self-driving degree is relatively low. In other words, according to the vehicle control device 1 of the present embodiment, the anti-fogging function is reduced in the self-driving state in which the self-driving degree is high, as a result of which various issues caused by the anti-fogging function are prevented from occurring.

The issues caused by the anti-fogging function will be described below. In order to exhibit the anti-fogging function of various anti-fogging devices, various kinds of energies such as an energy for warming up or cooling an air are required. Therefore, if the anti-fogging device exhibits the anti-fogging function when not required, the energy is wastefully consumed. Further, for example, in the case of an anti-fogging device that performs anti-fogging by warming a low-temperature air supplied from the outside and applying a resultant high-temperature air to the window, a face of the occupant or the like is warmed by the high-temperature air supplied, which may cause discomfort to the occupant. In addition, in the case of an anti-fogging device that performs the anti-fogging by supplying the low humidity air supplied from the outside into the vehicle interior, the humidity in the vehicle interior is lowered by the low humidity air, which may cause pain or discomfort to the occupant due to drying of the throat or eyes.

Incidentally, a reduction in the anti-fogging function makes it difficult to prevent the occurrence of fogging in the front windshield 100a or the like. However, the vehicle can safely travel even if the driver cannot visually recognize the state in the vehicle traveling direction because the self-driving state is high in the self-driving degree. With the above configuration, the anti-fogging function is lowered when the driving load of the driver is small, thereby being capable of reducing the issues caused by the anti-fogging.

As a specific example, the defogging unit according to the present embodiment is an air conditioner (that is, the vehicle air conditioner 2) that introduces the outside air or inside air, warms the introduced outside air or inside air to a predetermined temperature (that is, a warming target temperature), and then supplies the warmed air into the vehicle interior. The defogging unit is controlled so that the amount of introduced outside air to the amount of introduced inside air becomes small, to thereby lower the anti-fogging function.

As a specific example, the defogging unit (that is, the vehicle air conditioner 2) according to the present embodiment reduces the amount of air supplied to the front windshield 100a side of the vehicle interior, to thereby lower the anti-fogging function.

When the switching control for changing the self-driving degree (that is, the automation level) is performed, the vehicle control device 1 rotates the foremost seat (that is, the front seat 100b) installed in the self-driving vehicle 100 with the up-down direction DRv as the axis CL.

Specifically, when the self-driving degree changes from the first value to the second value (that is, when the automation level changes from any of 0 to 3 to 4), the vehicle control device 1 rotates the foremost seat so as to face the rear side in the front-rear direction DRfr. When the self-driving degree returns to the first value, the vehicle control device 1 rotates the foremost seat so that the foremost seat faces the front side in the front-rear direction DRfr.

According to the vehicle control device 1 of the present embodiment, the occupant seated on the front seat 100b can be prevented from feeling discomfort by visually recognizing the front windshield 100a fogged by lowering the anti-fogging function.

In this example, in the present embodiment, an example has been described in which the vehicle control device 1 controls the anti-fogging function by changing the respective positions of the inside-outside air switching door 24, the air mixture door 25, and the defroster door 26 in accordance with the self-driving degree, but the present disclosure is not limited to the above configuration. The vehicle control device 1 may be configured to control the anti-fogging function by changing at least one position of the inside-outside air switching door 24, the air mixture door 25, and the defroster door 26 in accordance with, for example, the self-driving degree. The same also applies to the following embodiments.

First Modification

In the first embodiment described above, an example has been described in which the vehicle control device 1 controls the anti-fogging function by changing the respective positions of the inside-outside air switching door 24, the air mixture door 25, and the defroster door 26 in accordance with the self-driving degree, but the present disclosure is not limited to the above configuration.

The vehicle control device 1 may be configured to realize the anti-fogging of the front windshield 100a by, for example, supplying the air (that is, cold air) passing through the evaporator 22 and passing through the bypass passage into the vehicle interior to lower the temperature and humidity in the vehicle interior. In other words, the vehicle air conditioner 2 which cools the air to a predetermined temperature (hereinafter referred to as a cooling target temperature), and supplies the cooled and dehumidified air into the vehicle interior may be employed as the defogging unit. Also in this case, when the self-driving degree has been changed to be set to be high, the vehicle control device 1 controls the vehicle air conditioner 2 so as to lower the anti-fogging function, thereby obtaining the same effects as those in the first embodiment.

Figure 7:
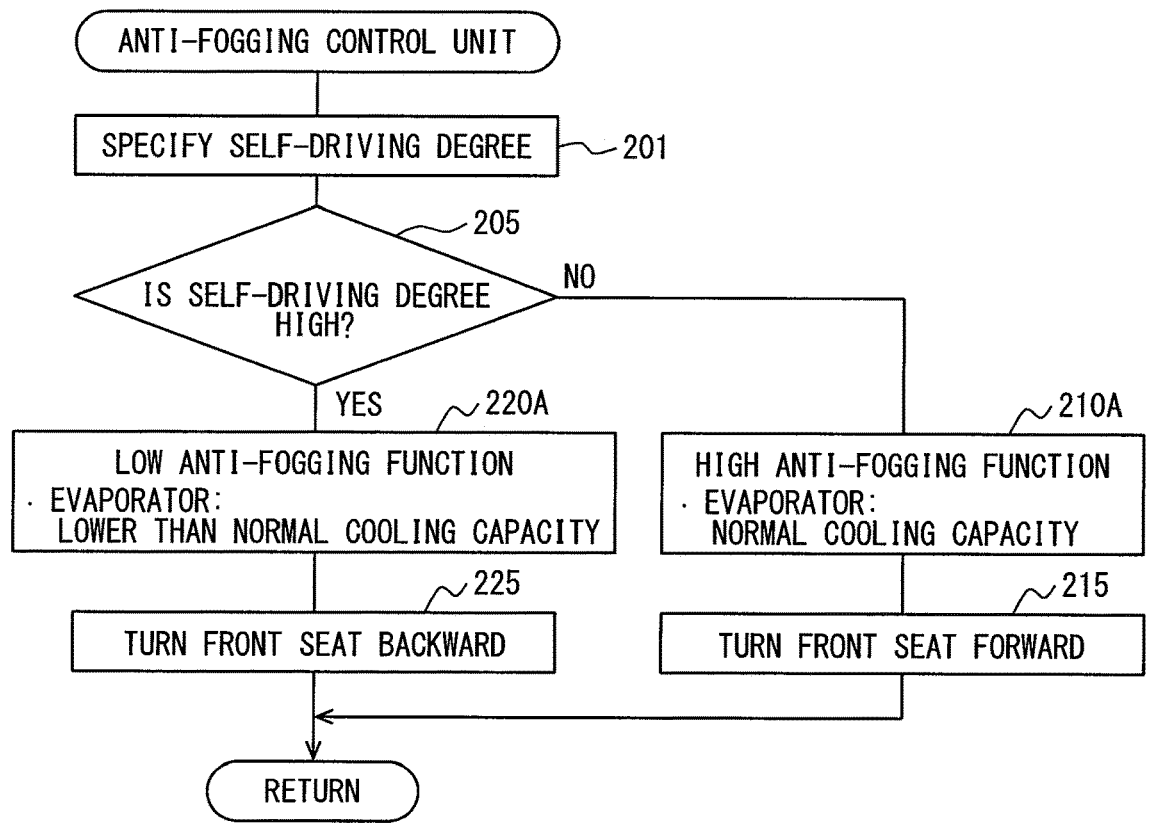
FIG. 7 is a flowchart of processing executed by an anti-fogging control unit according to a first modification of the first embodiment.

Specifically, the anti-fogging control unit 12 according to the present modification executes the processing shown in FIG. 7 instead of the processing shown in FIG. 5. When the CPU of the vehicle control device 1 executes the program, the anti-fogging control unit 12 executes the processing of FIG. 7. Steps denoted by the same reference numerals in the processing of FIG. 5 and the processing of FIG. 7 execute the same processing unless otherwise stated.

As shown in FIG. 7, when the anti-fogging control unit 12 determines in Step 205 that the self-driving degree is low, the anti-fogging control unit 12 proceeds to Step 210A. In Step 210A, the anti-fogging control unit 12 controls the vehicle air conditioner 2 so that the evaporator 22 exhibits a normal cooling capacity. In that case, for example, the anti-fogging control unit 12 controls the vehicle air conditioner 2 such that the temperature of the refrigerant flowing into the evaporator 22 is lower than a dew point temperature of the air flowing into the evaporator 22. As a result, a moisture in the air flowing into the evaporator 22 is condensed when passing through the evaporator 22, thereby being capable of generating a low-temperature and low-humidity air.

On the other hand, when the anti-fogging control unit 12 determines in Step 205 that the self-driving degree is high, the anti-fogging control unit 12 proceeds to Step 220A. In Step 220A, the anti-fogging control unit 12 controls the vehicle air conditioner 2 so that the cooling capacity of the evaporator 22 is lower than the normal cooling capacity. In that case, for example, the anti-fogging control unit 12 controls the vehicle air conditioner 2 so that the temperature of the refrigerant flowing into the evaporator 22 becomes higher than the temperature of the refrigerant flowing into the evaporator 22 when the process of Step 210A is executed.

As described above, the anti-fogging control unit 12 according to the present modification lowers the anti-fogging function by lowering an evaporation capability of the evaporator 22, that is, by raising a cooling target temperature of the evaporator 22 when the self-driving degree has been changed to be set to be high. With a reduction in the evaporation capacity of the evaporator 22, the cooling capacity and dehumidification capacity of the evaporator 22 decrease.

In the present modification, a cooling unit different from the evaporator 22 can be employed. For example, when a Peltier element is used as another cooling unit, the anti-fogging function may be lowered by lowering an energization power to the Peltier element when the self-driving degree has been changed to be set to be high. When the energizing power to the Peltier element is lowered, the cooling capacity and dehumidification capacity of the Peltier element are lowered.

In the present modification, the anti-fogging control unit 12 of the vehicle control device 1 corresponds to an identification unit by executing Step 201, and corresponds to a control execution unit by executing Steps 205, 210A, 215, 220A, and 225.

Second Modification

Figure 8:
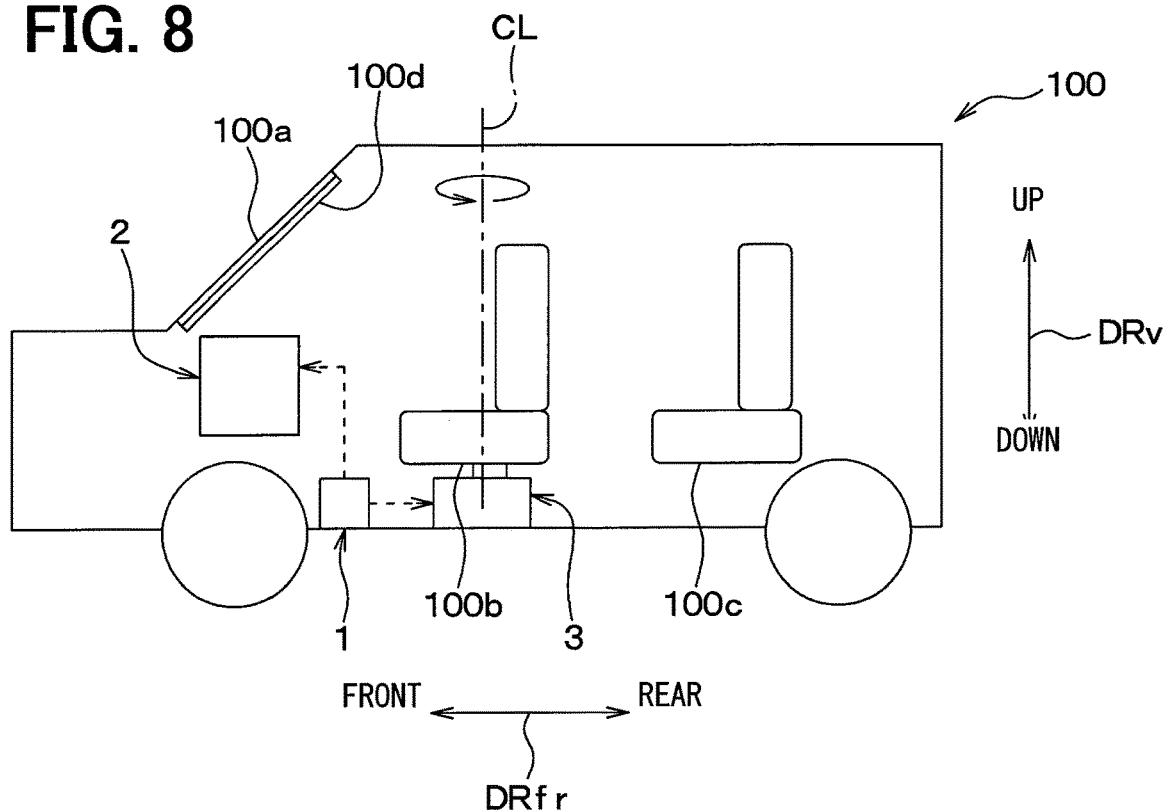
FIG. 8 is a schematic diagram illustrating an overall configuration of a self-driving vehicle controlled by a vehicle control device according to a second modification of the first embodiment.

In the present modification, as shown in FIG. 8, an example in which an electric heat generation member 100d functioning as a defogging unit is provided on the front windshield 100a of the self-driving vehicle 100 will be described. The electric heat generation member 100d is provided inside the front windshield 100a, and is configured by a heating wire that generates a heat by energization.

The self-driving vehicle 100 can reduce fogging in the front windshield 100a by supplying the heat generated when the electric heat generation member 100d is energized to the front windshield 100a to warm the front windshield 100a. In the present modification, the electric heat generation member 100d functions as the defogging unit.

In the present modification, when the vehicle control device 1 has been changed to be set to the high self-driving degree, the vehicle control device 1 controls the electric heat generation member 100d so as to reduce the anti-fogging function, thereby obtaining the same effects as those of the first embodiment.

Figure 9:
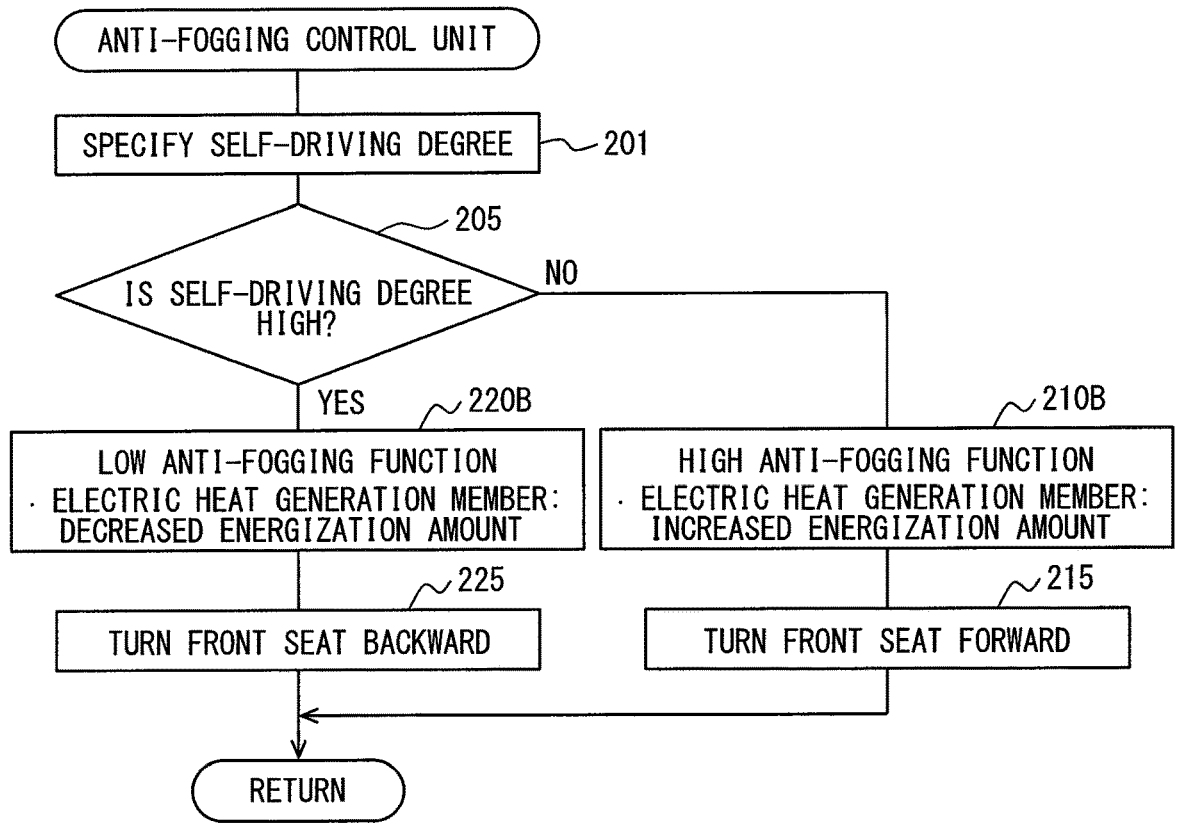
FIG. 9 is a flowchart of processing executed by an anti-fogging control unit according to the second modification of the first embodiment.

Specifically, the anti-fogging control unit 12 according to the present modification executes the processing shown in FIG. 9 instead of the processing shown in FIG. 5. When the CPU of the vehicle control device 1 executes the program, the anti-fogging control unit 12 executes the processing of FIG. 9. Steps to which the same reference numerals are assigned in the processing of FIG. 5 and the processing of FIG. 9 execute the same processing unless otherwise stated.

As shown in FIG. 9, when the anti-fogging control unit 12 determines in Step 205 that the self-driving degree is low, the anti-fogging control unit 12 proceeds to Step 210B. In Step 210B, the anti-fogging control unit 12 increases the amount of energization supplied to the electric heat generation member 100d.

On the other hand, when the anti-fogging control unit 12 determines in Step 205 that the self-driving degree is high, the anti-fogging control unit 12 proceeds to Step 220B. In Step 220B, the anti-fogging control unit 12 reduces the amount supplied to the electric heat generation member 100d to be lower than the amount of energization supplied to the electric heat generation member 100d when the process of Step 210B is executed. In other words, the anti-fogging control unit 12 lowers the anti-fogging function by lowering the amount of energization supplied to the electric heat generation member 100d when the self-driving degree has been changed to be set to be high.

In the present modification, the electric heat generation member 100d is formed of the heating wire provided inside the front windshield 100a, but the present disclosure is not limited to the above configuration. The electric heat generation member 100d may have a configuration in which, for example, a film that generates a heat by energization is attached to the front windshield 100a.

In the present modification, the anti-fogging control unit 12 of the vehicle control device 1 corresponds to an identification unit by executing Step 201, and corresponds to a control execution unit by executing Steps 205, 210B, 215, 220B, and 225.

Third Modification

In the first embodiment, an example has been described in which, when the self-driving degree has been changed to be set to be high, the vehicle control device 1 controls the inside-outside air switching door 24 to the inside air introduction position, the air mixture door 25 to the maximum heating position, and the defroster door 26 to the fully closed position, but the present disclosure is not limited to the above configuration.

Figure 10:
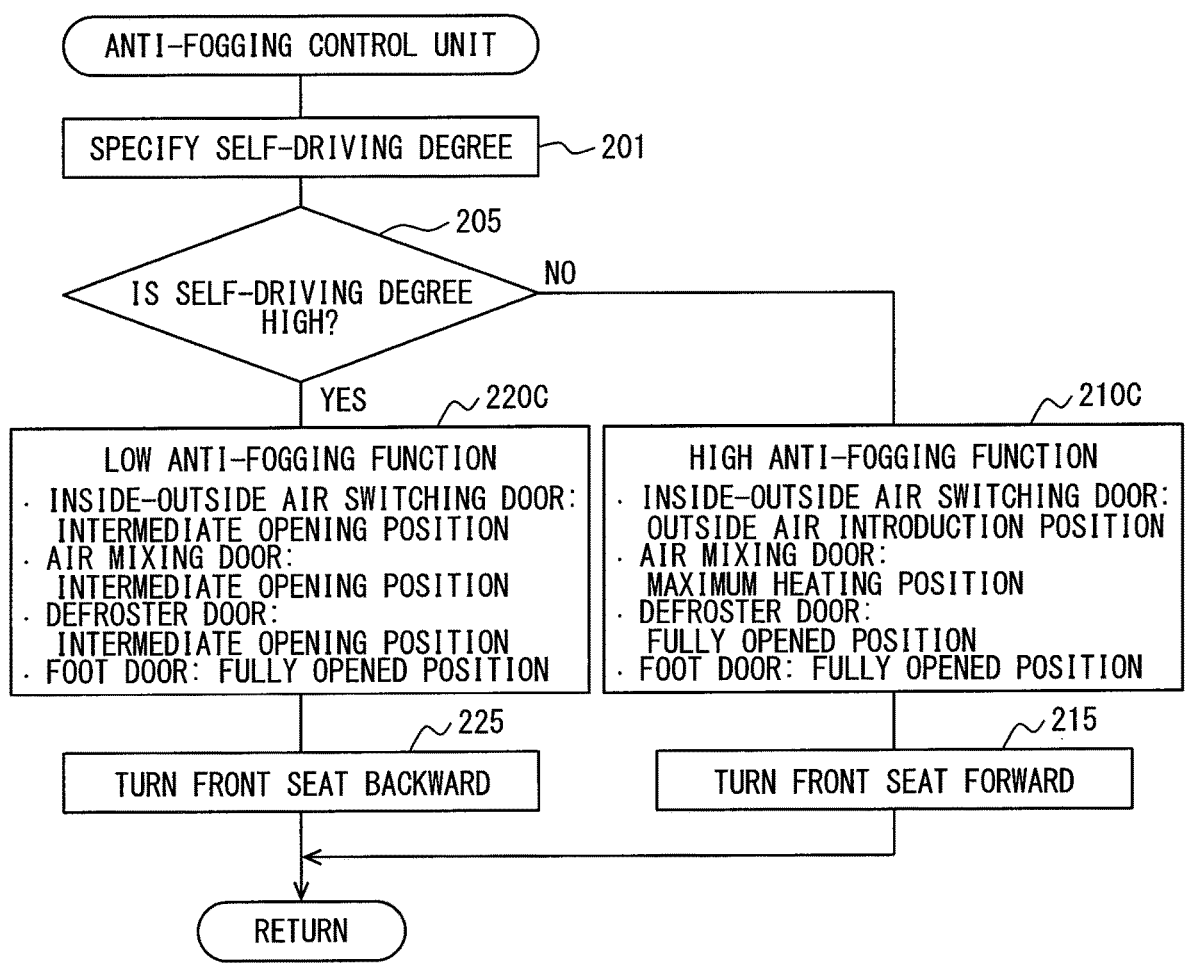
FIG. 10 is a flowchart of processing executed by an anti-fogging control unit according to a third modification of the first embodiment.

The anti-fogging control unit 12 according to the present modification executes the processing shown in FIG. 10 instead of the processing shown in FIG. 5. When the CPU of the vehicle control device 1 executes the program, the anti-fogging control unit 12 executes the processing of FIG. 10. Steps denoted by the same reference numerals in the processing of FIG. 5 and the processing of FIG. 10 execute the same processing unless otherwise stated.

As shown in FIG. 10, when the anti-fogging control unit determines in Step 205 that the self-driving degree is low, the anti-fogging control unit 12 proceeds to Step 210C and controls the vehicle air conditioner 2 so as to exhibit the anti-fogging function sufficiently high. The processing of Step 210C in FIG. 10 is the same as the processing of Step 210 in FIG. 5, and therefore a description of the same processing will be omitted.

On the other hand, when the anti-fogging control unit 12 determines in Step 205 that the self-driving degree is high, the anti-fogging control unit 12 proceeds to Step 220C, and controls the vehicle air conditioner 2 so as to lower the anti-fogging function than that in the case of Step 210C.

Figure 11:
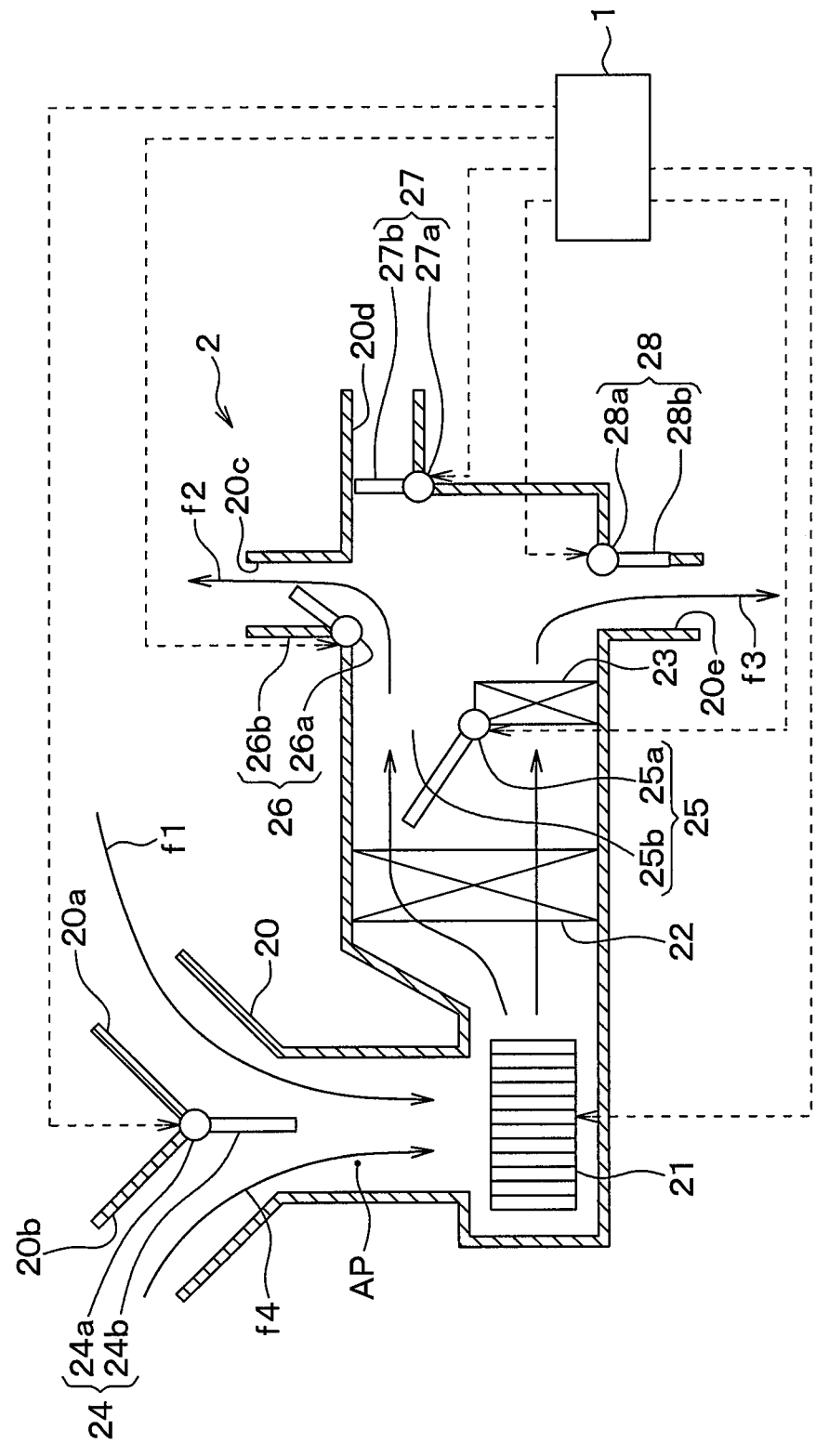
FIG. 11 is a schematic diagram showing an overall configuration of a vehicle air conditioner controlled by a vehicle control device according to the third modification of the first embodiment.

Specifically, in Step 220C, the anti-fogging control unit 12 controls the inside-outside air switching door 24 so that a position of the flat plate portion 24b becomes an intermediate introduction position. As a result, as shown in FIG. 11, not only the inside air but also the outside air are introduced into the vehicle air conditioner 2, thereby being capable of ventilating the vehicle interior.

In Step 220C, the anti-fogging control unit 12 controls the air mixture door 25 so that the position of the flat plate portion 25b becomes the intermediate opening position. As a result, as shown in FIG. 11, a flow rate of the air flowing into the heater core 23 decreases, so that the energy of the heater core 23 is hardly consumed.

Further, in Step 220C, the anti-fogging control unit 12 controls the defroster door 26 so that the position of the flat plate portion 26b becomes the intermediate opening position. In Step 220C, the anti-fogging control unit controls the foot door 28 so that the position of the flat plate portion 28b becomes the fully opened position. As a result, as shown in FIG. 11, the air conditioning wind is blown out toward the space on the lower side of the vehicle interior, and is also blown out to the vehicle interior side surface of the front windshield 100a slightly. As a result, the fogging of the front windshield 100a is slightly reduced.

In the vehicle control device 1 according to the present modification, similarly to the first embodiment, various issues caused by the anti-fogging function are reduced by reducing the anti-fogging function in the self-driving state in which the self-driving degree is high.

In particular, in the vehicle control device 1 according to the present modification, both of the inside air and the outside air are introduced into the vehicle air conditioner 2 when the self-driving degree has been changed to be set to be high. This makes it possible to prevent the humidity in the vehicle interior from excessively rising due to the ventilation in the vehicle interior.

Further, in the vehicle control device 1 according to the present modification, since the defroster door 26 is set to the intermediate opening position when the self-driving degree has been changed to be set to be high, the supply amount of air blown out to at least the front windshield 100a side becomes small. Therefore, the air conditioning wind can be prevented from being blown out from a space on an upper side of the vehicle interior.

Further, in the vehicle control device 1 of the present modification, since the air mixture door 25 is set to the intermediate opening position when the setting is changed to the high self-driving degree, the temperature of the air blown out to at least the front windshield 100a side is lowered. In other words, in the vehicle control device 1 of the present modification, when the self-driving degree has been changed to be set to be high, the warming target temperature of the air of the air blown to at least the front windshield 100a side becomes low. Therefore, the energy consumption amount in the heater core 23 can be suppressed.

In the present modification, an example has been described in which the vehicle control device 1 controls the anti-fogging function by changing the respective positions of the inside-outside air switching door 24, the air mixture door 25, and the defroster door 26 in accordance with the self-driving degree, but the present disclosure is not limited to the above configuration. The vehicle control device 1 may be configured to control the anti-fogging function by changing at least one position of the inside-outside air switching door 24, the air mixture door 25, and the defroster door 26 in accordance with, for example, the self-driving degree.

Further, in the present modification, an example has been described in which the supply amount of air blown out to at least the front windshield 100a side is reduced by setting the defroster door 26 to the intermediate opening position when the self-driving degree has been changed to be set to be high, but the present disclosure is not limited to the above configuration. The anti-fogging control unit 12 may be configured to reduce the supply amount of air blown out to at least the front windshield 100a side by, for example, reducing a feeding capacity of the blower 21 when the self-driving degree has been changed to be set to be high.

In the present modification, the anti-fogging control unit 12 of the vehicle control device 1 corresponds to an identification unit by executing Step 201, and corresponds to a control execution unit by executing Steps 205, 210C, 215, 220C, and 225.

Fourth Modification

Figure 12:
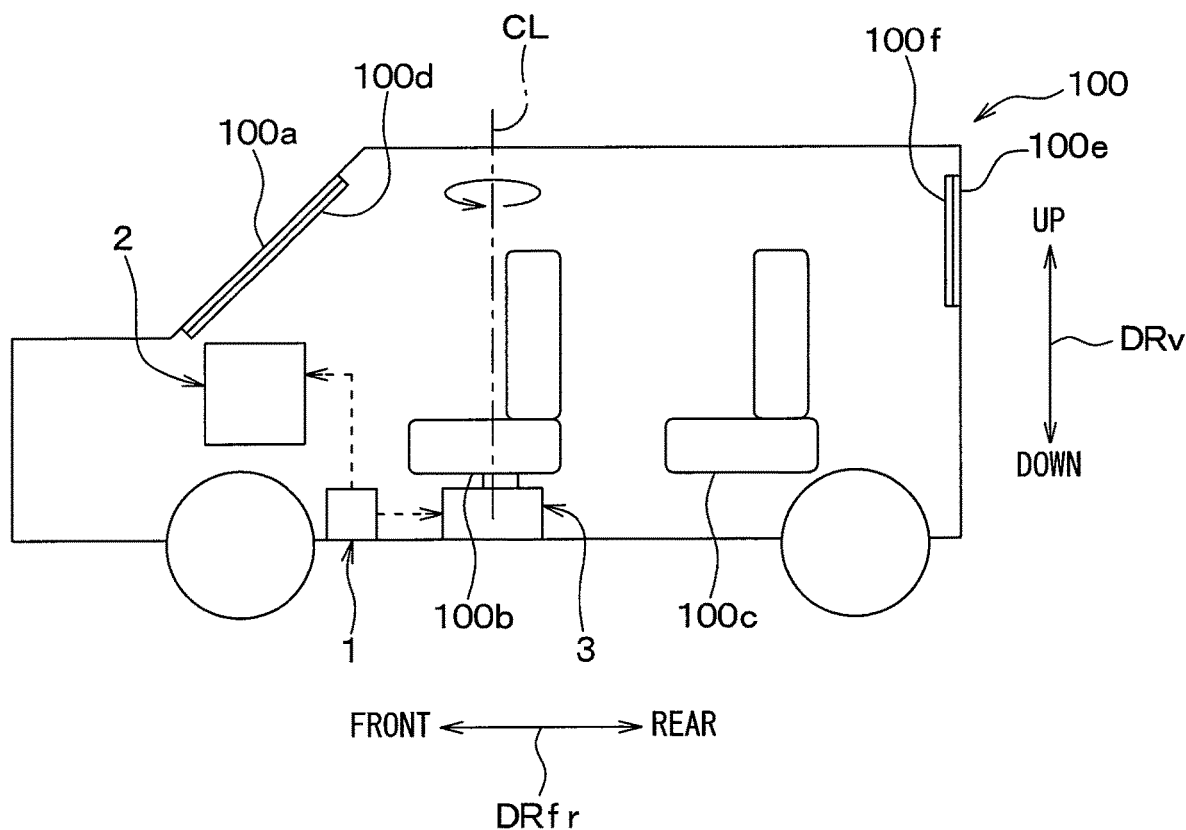
FIG. 12 is a schematic diagram illustrating an overall configuration of a self-driving vehicle controlled by a vehicle control device according to a fourth modification of the first embodiment.

In the present modification, as shown in FIG. 12, an example in which an electric heat generation member 100f functioning as a defogging unit is provided on a rear windshield 100e of the self-driving vehicle 100 will be described. As with the front windshield 100a, the rear windshield 100e is a glass member that separates the vehicle interior from the vehicle exterior. At least a part of the rear windshield 100e has transparency so that an occupant in the vehicle interior can visually recognize the vehicle exterior. The rear windshield 100e is disposed behind the rear seat 100c in the front-rear direction DRfr of the self-driving vehicle 100.

The electric heat generation member 100f is provided inside the rear windshield 100e, and is formed of a heating wire that generates heat by energization. The self-driving vehicle 100 can reduce fogging on the rear windshield 100e by supplying the heat generated when the electric heat generation member 100f is energized to the rear windshield 100e to warm the rear windshield 100e. In the present modification, the electric heat generation member 100f functions as a defogging unit.

In the present modification, the vehicle control device 1 not only lowers the anti-fogging function in the front windshield 100a but also lowers the anti-fogging function in the rear windshield 100e when the self-driving degree has been changed to be set to be high. Specifically, the vehicle control device 1 lowers the amount of energization supplied to the electric heat generation member 100f so that the anti-fogging function in the rear windshield 100e is lowered when the self-driving degree has been changed to be set to be high.

In this example, the fogging of the rear windshield 100e has a smaller influence on the driving operation of the driver than the fogging of the front windshield 100a. For that reason, the vehicle control device 1 may have a configuration in which the anti-fogging function in the rear windshield 100e is lowered before the anti-fogging function in the front windshield 100a is lowered, for example. In other words, a timing at which the anti-fogging function in the rear windshield 100e is lowered may be deviated from a timing at which the anti-fogging function in the front windshield 100a is lowered.

In the present modification, an example in which the electric heat generation member 100f is formed of a heating wire provided inside the rear windshield 100e has been described, but the present disclosure is not limited to the above configuration. The electric heat generation member 100f may have a configuration in which, for example, a film that generates the heat by energization is adhered to the rear windshield 100e.

In the present modification, an example in which the electric heat generation member 100f is provided on the rear windshield 100e of the self-driving vehicle 100 has been described, but the present disclosure is not limited to the above configuration. The vehicle control device 1 may be configured to reduce the anti-fogging function of the side glass when the setting has been changed to the self-driving degree, for example, in the self-driving vehicle 100 in which the side glass is provided with the electric heat generation member.

Second Embodiment

Hereinafter, a second embodiment will be described with reference to FIG. 13. In the present embodiment, the control conditions of the defogging unit (that is, the vehicle air conditioner 2, and so on) by the vehicle control device 1 according to the first embodiment are changed. Since the other portions are basically the same as those of the first embodiment, only a portion different from that of the first embodiment will be described.

In the first embodiment, the anti-fogging control unit 12 of the vehicle control device 1 executes a control to change the anti-fogging function of the defogging unit when the setting is changed to the high self-driving degree or when the setting is changed to the low self-driving degree. In addition, the anti-fogging control unit 12 according to the present embodiment performs a control to change the anti-fogging function of the defogging unit when detecting a predetermined sign that a switching control to change the self-driving degree is performed. The predetermined sign is transmitted to the vehicle control device 1 and can be detected by the vehicle control device 1 (for example, an electric signal).

Figure 13:
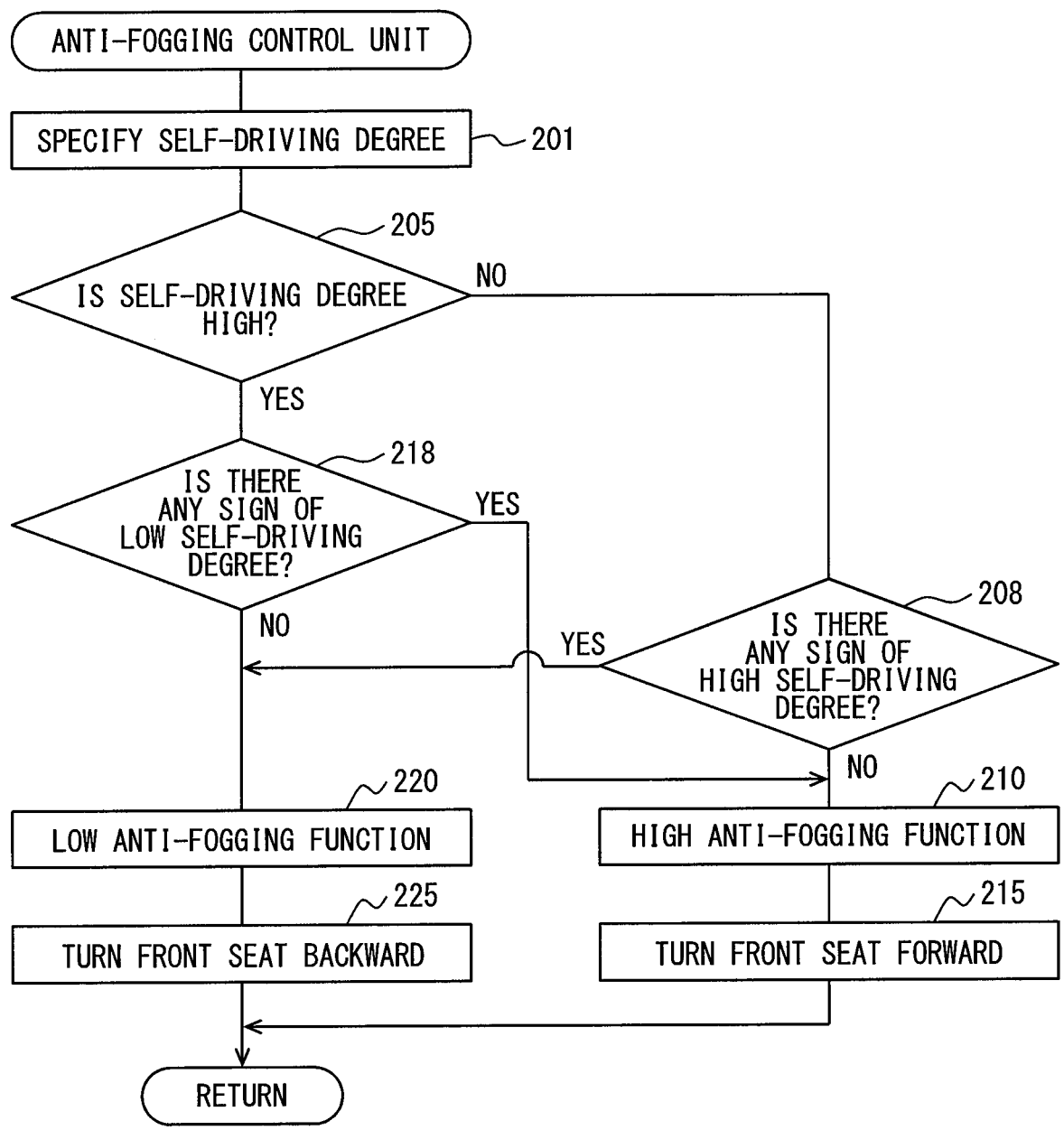
FIG. 13 is a flowchart of processing executed by an anti-fogging control unit according to a second embodiment.

Specifically, an anti-fogging control unit 12 according to the present embodiment executes processing shown in FIG. 13 instead of the processing shown in FIG. 5. When a CPU of the vehicle control device 1 executes a program, the anti-fogging control unit 12 executes the processing of FIG. 13. Steps to which the same reference numerals are assigned in the processing of FIG. 5 and the processing of FIG. 13 execute the same processing unless otherwise stated.

In the processing of FIG. 13, when the anti-fogging control unit 12 determined in Step 205 that the self-driving degree is high, the anti-fogging control unit 12 proceeds to Step 218. In Step 218, the anti-fogging control unit 12 determines whether or not a predetermined sign that the switching control for lowering the self-driving degree is performed is detected. If such a sign is detected, the anti-fogging control unit 12 proceeds to Step 210, and changes the anti-fogging function to a high level before the switching control for lowering the self-driving degree is performed. As an example of lowering the self-driving degree, the automation level may be changed to any one of 0 to 3 from 4.

If the anti-fogging control unit 12 does not detect in Step 218 that the predetermined sign that the switching control for lowering the self-driving degree is performed, the anti-fogging control unit 12 proceeds to Step 220 to set the anti-fogging function to be low.

The predetermined sign that the switching control for lowering the self-driving degree is performed is, for example, when a driver operates a steering wheel, a shift lever, or the like. In that case, when the driver operates the steering wheel, the shift lever, or the like, it is assumed that the switching control for lowering the self-driving degree is performed, and the vehicle control device 1 controls the defogging unit so as to enhance the anti-fogging function more in advance before the switching control for lowering the self-driving degree is performed. In other words, when detecting an operation signal of a device operated by the driver during manual operation of the steering wheel, the shift lever, or the like, the vehicle control device 1 determines that the predetermined sign of performing switching control for lowering the self-driving degree has been detected.

In addition, as a predetermined sign of performing the switching control for lowering the self-driving degree, there is a case in which the vehicle traveling in front is moving unnaturally, for example, rapidly decelerating, when the self-driving degree is such that the driving operation of the driver is required in an emergency (for example, automation levels 1 to 3). In that case, the self-driving degree is lowered when the automation level is changed from 1 to 3 to a lower level.

As described above, the vehicle control device 1 according to the present embodiment assumes that the switching control for lowering the self-driving degree is performed when the predetermined sign as described above is detected. Then, the vehicle control device 1 controls the defogging unit so as to exhibit the anti-fogging function more in advance, before the switching control for lowering the self-driving degree is performed on the basis of the assumption as described above. As described above, with the execution of the anti-fogging function in advance, an issue that the anti-fogging is not performed in time at the time of driving by the driver is less likely to occur, and the safety can be sufficiently secured.

When the anti-fogging control unit 12 determines in Step 205 that the self-driving degree is low in the processing of FIG. 13, the anti-fogging control unit 12 proceeds to Step 208. In Step 208, the anti-fogging control unit 12 determines whether or not the predetermined sign that the switching control for increasing the self-driving degree is performed is detected. If such a sign is detected, the process proceeds to Step 220, where the anti-fogging function is changed to a low level before the switching control for increasing the self-driving degree is performed. As an example of increasing the self-driving degree, the automation level may be changed from any one of 0 to 3 to 4.

If the anti-fogging control unit 12 does not detects the predetermined sign that the switching control for increasing the self-driving degree is performed is not in Step 208, the anti-fogging control unit 12 proceeds to Step 210 to set the anti-fogging function to be high.

The predetermined sign that the switching control for increasing the self-driving degree is performed is when one or both of fatigue and drowsiness of the driver are detected. As a method of detecting fatigue and drowsiness of a driver, a well-known method is adopted. For example, the vehicle control device 1 may detect the presence or absence of fatigue of the driver and the presence or absence of the drowsiness of the driver based on an image captured from the face of the driver.

As described above, the vehicle control device 1 according to the present embodiment assumes that the switching control for increasing the self-driving degree is performed when the predetermined sign is detected as described above, and controls the defogging unit so that the anti-fogging function is lowered in advance before the switching control for increasing the self-driving degree is performed. In this manner, with a reduction in the anti-fogging function in advance, the energy required for the anti-fogging function can be further saved.

In the present embodiment, the anti-fogging control unit 12 of the vehicle control device 1 corresponds to an identification unit by executing Step 201, and corresponds to a control execution unit by executing Steps 205, 208, 210, 215, 218, 220, and 225.

In this example, in the processing of FIG. 13, the anti-fogging control unit 12 lowers the anti-fogging function in Step 220 and rotates the front seat 100*b* backward in Step 225 before the switching control for increasing the self-driving degree is performed, but the present disclosure is not limited to the above configuration. The anti-fogging control unit 12 may be configured to lower the anti-fogging function in Step 220 before the switching control for increasing the self-driving degree is performed, and rotate the front seat 100*b* backward in Step 225 after the switching control for increasing the self-driving degree is performed.

In the present embodiment, an example in which the anti-fogging function is controlled before the level of the self-driving degree is switched to another has been described, but the present disclosure is not limited to the above configuration. For example, the vehicle control device 1 may be configured to control the defogging unit so that the anti-fogging function is lowered before the self-driving degree becomes high, and the anti-fogging function is not raised before the self-driving degree becomes low. Conversely, the vehicle control device 1 may be configured to control the defogging unit so that, for example, the anti-fogging function becomes high before the self-driving degree becomes low, and the anti-fogging function does not become low before the self-driving degree becomes low. The same also applies to the following third embodiment.

Third Embodiment

Hereinafter, a third embodiment will be described with reference to FIGS. 14 to 17. In the present embodiment, the functional configurations of the vehicle control device 1 and the control conditions of the defogging unit (that is, the vehicle air conditioner 2, and so on) according to the first embodiment are changed. Since the other portions are basically the same as those of the first embodiment, only a portion different from that of the first embodiment will be described.

Figure 14:
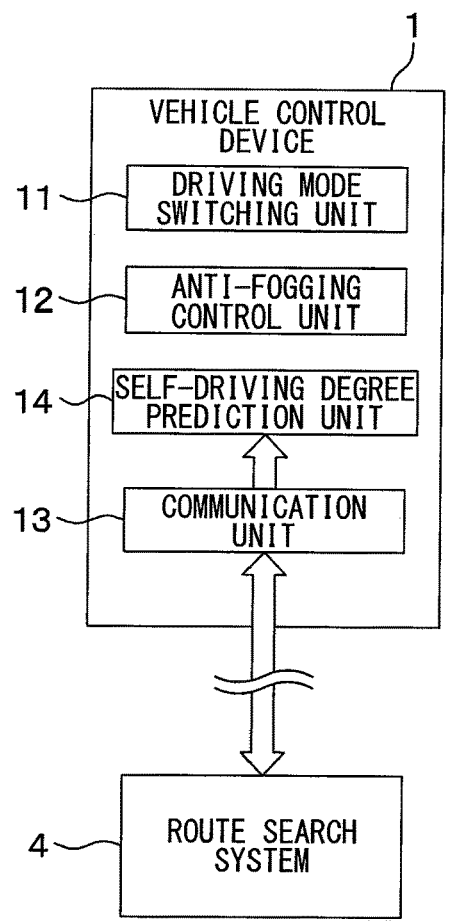
FIG. 14 is a functional configuration diagram of a vehicle control device according to a third embodiment.

As shown in FIG. 14, a vehicle control device 1 according to the present embodiment functions not only as a driving mode switching unit 11 and an anti-fogging control unit 12 but also as a communication unit 13 for communicating with the outside and also as a self-driving prediction unit 14.

The communication unit 13 is configured to be able to communicate with a route search system 4 mounted on a self-driving vehicle 100 and searching for a driving route of the self-driving vehicle 100. Specifically, the communication unit 13 is configured to be able to acquire information on the driving route searched by the route search system 4. The route search system 4 is a system for searching a driving route from a current place identified by a GPS (positional information system) or a position information system such as an on-board camera to a destination determined by a user.

The self-driving prediction unit 14 predicts that a switching control for changing the self-driving degree is performed. The self-driving prediction unit 14 according to the present embodiment is configured to be able to identify, as a prediction section, a section in which switching control for changing the self-driving degree is performed, among the driving routes searched by the route search system 4.

In this example, the level 4 of the automation level at which the self-driving system performs all of acceleration, steering, and braking is predicted to be selected, for example, when the vehicle is traveling on a vehicle exclusive road (for example, an expressway) in which the penetration of a pedestrian is prohibited.

Therefore, the self-driving prediction unit 14 according to the present embodiment is configured to identify, as a prediction section, a section in which the switching control for changing the self-driving degree is performed on a vehicle exclusive road among the driving routes searched by the route search system 4.

Further, the self-driving prediction unit 14 is configured to be able to identify a predicted arrival time Ts to a start point of the prediction section included in the driving route searched by the route search system 4 and a predicted arrival time Te to an end point of the prediction section based on a current location information and a traveling speed information. The self-driving prediction unit 14 is desirably configured to calculate the predicted arrival times Ts and Te in consideration of not only the current location information and the traveling speed information but also a traffic congestion information on the driving route.

Further, the self-driving prediction unit 14 is configured to be able to calculate a required anti-fogging time Tα necessary to prevent fogging in the front windshield 100a based on vehicle environment information such as the temperature and humidity of the inside air, the temperature and humidity of the outside air, and the amount of insolation. The self-driving prediction unit 14 is desirably configured to calculate the required anti-fogging time Tα in consideration of not only the temperature and humidity of the inside air, the temperature and humidity of the outside air, and the amount of insolation, but also a weather in the driving route, the number of occupants, the anti-fogging performance of the defogging unit, the characteristics of the vehicle (for example, a size of the vehicle interior space, a window shape), and the like. Further, it is desirable that the required anti-fogging time Tα is a minimum time required to prevent fogging of a region of the front windshield 100a located on the front surface of the driver.

Figure 15:
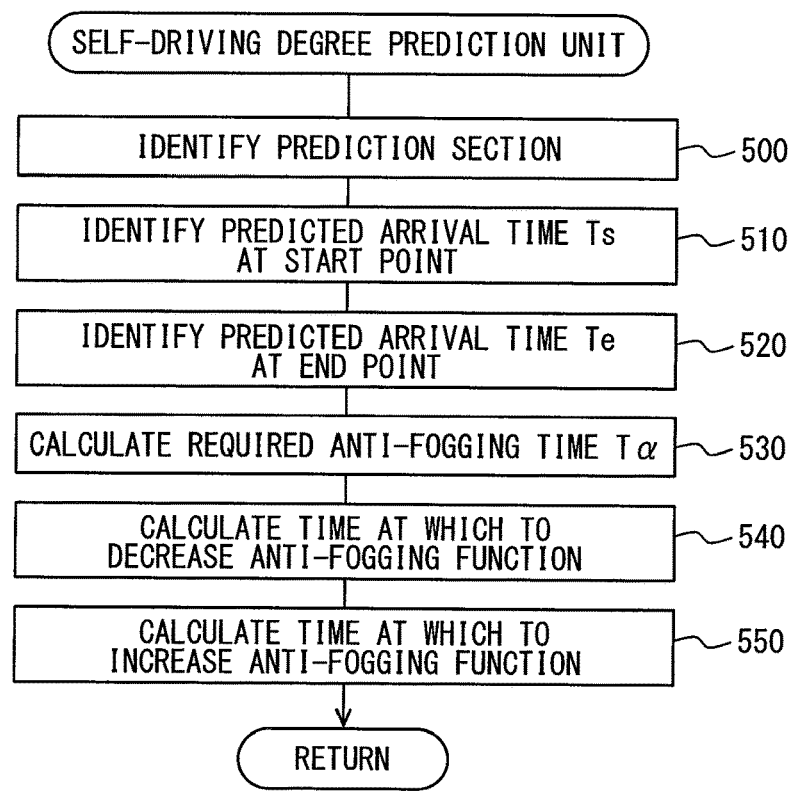
FIG. 15 is a flowchart of processing executed by a self-driving prediction unit according to the third embodiment.

Specifically, the self-driving prediction unit 14 according to the present embodiment executes the processing shown in FIG. 15. When the CPU of the vehicle control device 1 executes the program, the self-driving prediction unit 14 executes the processing of FIG. 15.

First, in Step 500, the self-driving prediction unit 14 identifies a prediction section in which the self-driving degree is predicted to be high among the driving routes searched by the route search system 4. Specifically, in Step 500, the self-driving prediction unit 14 identifies a prediction section in which the self-driving degree is predicted to be level 4 (that is, second value) among the driving routes searched by the route search system 4.

Subsequently, in Step 510, the self-driving prediction unit 14 identifies the predicted arrival time Ts to the start point of the prediction section identified in Step 500. In addition, in Step 520, the self-driving prediction unit 14 identifies the predicted arrival time Te to the end point of the prediction section identified in Step 500. Further, in Step 530, the self-driving prediction unit 14 calculates the required anti-fogging time Tα required to prevent fogging in the front windshield 100a.

Subsequently, in Step 540, the self-driving prediction unit 14 calculates a time at which the anti-fogging function is to be lowered. The self-driving prediction unit 14 according to the present embodiment calculates the time at which the anti-fogging function is lowered based on the predicted arrival time Ts to the start point of the prediction section identified in Step 510 and the preset set time Tβ. The self-driving prediction unit 14 calculates, for example, a time which is a preset set time Tβ before the predicted arrival time Ts to the start point of the prediction section as a time at which the anti-fogging function is lowered. The set time Tβ is set to, for example, a time at which fogging is predicted to start to occur in the front windshield 100a when the anti-fogging function is stopped.

Subsequently, in Step 550, the self-driving prediction unit 14 calculates a time at which the anti-fogging function is increased. The self-driving prediction unit 14 according to the present embodiment calculates the time at which the anti-fogging function is increased based on the predicted arrival time Ts to the end point of the prediction section identified in Step 520 and the required anti-fogging time Tα identified in Step 530. For example, the self-driving prediction unit 14 calculates the time which is the required anti-fogging time Tα before the predicted arrival time Ts to the end point of the prediction section as the time at which the anti-fogging function is increased.

Figure 16:
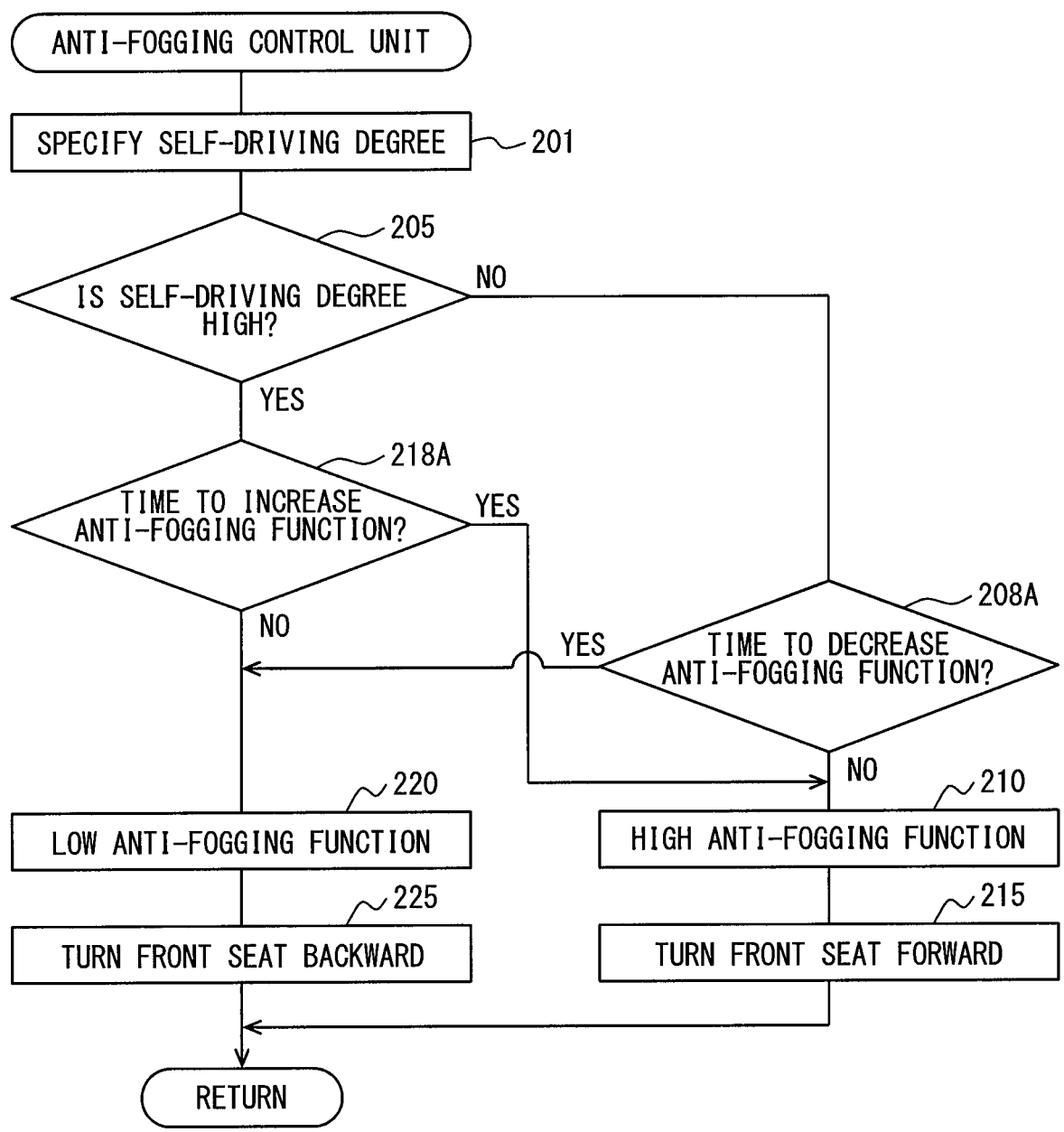
FIG. 16 is a flowchart of processing executed by an anti-fogging control unit according to the third embodiment.

Next, the anti-fogging control unit 12 according to the present embodiment executes the processing shown in FIG. 16 instead of the processing shown in FIG. 5. When the CPU of the vehicle control device 1 executes the program, the anti-fogging control unit 12 executes the processing of FIG. 16. Steps to which the same reference numerals are assigned in the processing of FIG. 5 and the processing of FIG. 16 execute the same processing unless otherwise stated.

As shown in FIG. 16, when the anti-fogging control unit 12 determines in Step 205 that the self-driving degree is low, the anti-fogging control unit 12 proceeds to Step 208A. In Step 208A, the anti-fogging control unit 12 determines whether or not the current time has reached the time at which the anti-fogging function calculated by the self-driving prediction unit 14 is lowered.

As a result, if the current time has not reached the time at which the anti-fogging function is lowered, the anti-fogging control unit 12 proceeds to Step 210 and maintains the anti-fogging function in a high state.

Figure 17:
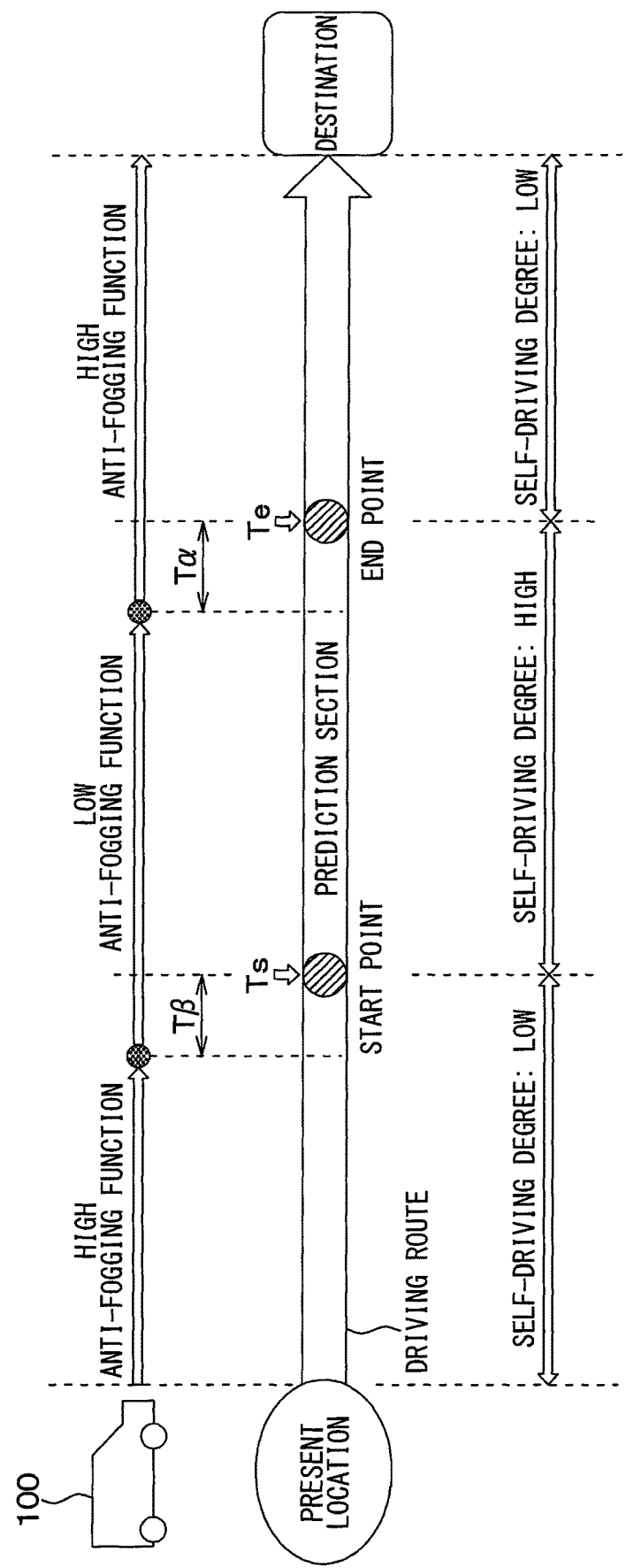
FIG. 17 is an illustrative diagram illustrating a control state of an anti-fogging function with respect to a driving route.

On the other hand, when the current time reaches the time at which the anti-fogging function is lowered, the anti-fogging control unit 12 proceeds to Step 220 and changes the anti-fogging function to be lowered. In other words, as shown in FIG. 17, the anti-fogging control unit 12 according to the present embodiment lowers the anti-fogging function a predetermined time before reaching the start point of the prediction section in which the self-driving degree is predicted to be level 4 in the driving routes searched by the route search system 4.

As described above, the vehicle control device 1 according to the present embodiment controls the defogging unit in advance so that the anti-fogging function is lowered before the switching control for increasing the self-driving degree is performed. This makes it possible to save the energy required for the anti-fogging function.

Returning to FIG. 16, when the anti-fogging control unit 12 determines in Step 205 that the self-driving degree is high, the anti-fogging control unit 12 proceeds to Step 218A. In Step 218A, the anti-fogging control unit 12 determines whether or not the current time has reached the time at which the anti-fogging function calculated by the self-driving prediction unit 14 is increased.

As a result, if the current time has not reached the time at which the anti-fogging function is increased, the anti-fogging control unit 12 proceeds to Step 220 and maintains the anti-fogging function in a low state.

On the other hand, when the current time has reached the time at which the anti-fogging function is increased, the anti-fogging control unit 12 proceeds to Step 210 and changes the anti-fogging function to be high. As shown in FIG. 17, the anti-fogging control unit 12 according to the present embodiment raises the anti-fogging function a predetermined time before reaching the end point of the prediction section in which the self-driving degree is predicted to be level 4 in the driving routes searched by the route search system 4. Specifically, the anti-fogging control unit 12 increases the anti-fogging function the required anti-fogging time Tα before reaching the end point of the prediction section.

As described above, the vehicle control device 1 according to the present embodiment controls the defogging unit in advance so that the anti-fogging function becomes high in advance before the switching control for lowering the self-driving degree is performed. According to the above configuration, since an issue that the anti-fogging is not performed in time during driving by the driver is less likely to occur, the safety can be sufficiently ensured.

In this example, in the processing of FIG. 16, the anti-fogging control unit 12 lowers the anti-fogging function in Step 220 and rotates the front seat 100b backward in Step 225 before the switching control for increasing the self-driving degree is performed, but the present disclosure is not limited to the above configuration. The anti-fogging control unit 12 may be configured to lower the anti-fogging function in Step 220 before the switching control for increasing the self-driving degree is performed, and rotate the front seat 100b backward in Step 225 after the switching control for increasing the self-driving degree is performed.

In the present embodiment, an example in which the communication unit 13 of the vehicle control device 1 is configured to be able to communicate with the route search system 4 mounted on the vehicle has been described, but the present disclosure is not limited to the above configuration. The communication unit 13 of the vehicle control device 1 may be configured to be able to communicate with, for example, the route search system 4 outside the vehicle. In other words, the communication unit 13 may be configured to be able to acquire information on the driving route searched by the route search system 4 outside the vehicle.

The vehicle control device 1 according to the present embodiment has been described as an example in which the self-driving prediction unit 14 executes the processing from Step 500 to Step 520 shown in FIG. 15, but the present disclosure is not limited to the above configuration. When the route search system 4 can identify the processing from Step 500 to Step 520 shown in FIG. 15, the self-driving prediction unit 14 may be configured to execute the processing from Step 530 to Step 550 shown in FIG. 15.

In addition, as in the present embodiment, it is preferable that the vehicle control device 1 is configured to calculate the required anti-fogging time Tα by the self-driving prediction unit 14, and calculate the time at which the anti-fogging function is increased based on the calculated required anti-fogging time Tα, but the present disclosure is not limited to the above configuration. For example, the vehicle control device 1 may be configured to calculate the time at which the anti-fogging function is increased based on a predetermined required anti-fogging time Tα.

In the present embodiment, the anti-fogging control unit 12 of the vehicle control device 1 corresponds to an identification unit by executing Step 201, and corresponds to a control execution unit by executing Steps 205, 208A, 210, 215, 218A, 220, and 225.

Fourth Embodiment

Hereinafter, a fourth embodiment will be described with reference to FIGS. 18 to 20. In the present embodiment, the functional configuration and the control conditions of the defogging unit (that is, the vehicle air conditioner 2 and the like) according to the first embodiment are changed. Since the other portions are basically the same as those of the first embodiment, only a portion different from that of the first embodiment will be described.

Figure 18:
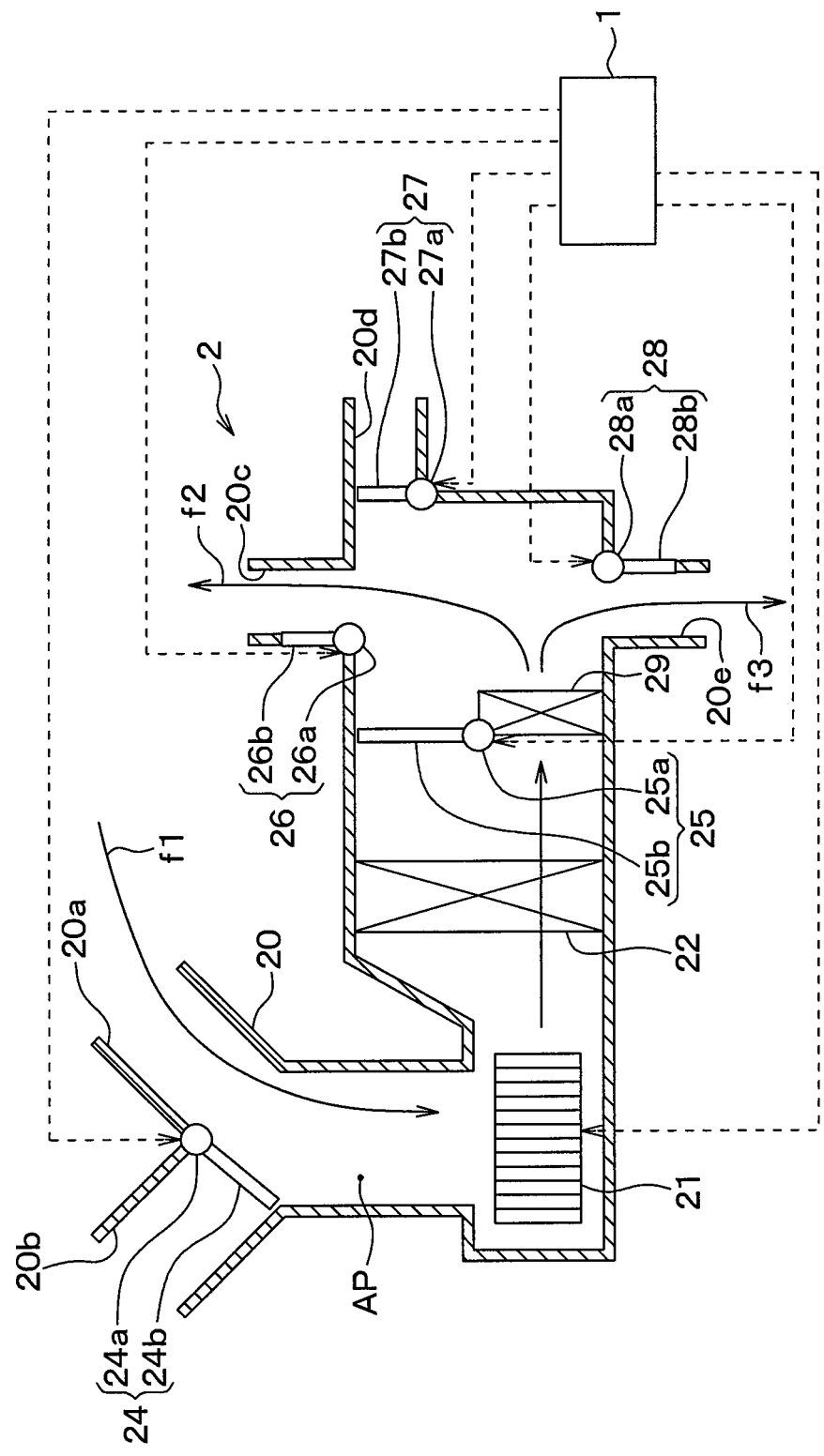
FIG. 18 is a schematic diagram showing an overall configuration of a vehicle air conditioner controlled by a vehicle control device according to a fourth embodiment.
Figure 19:
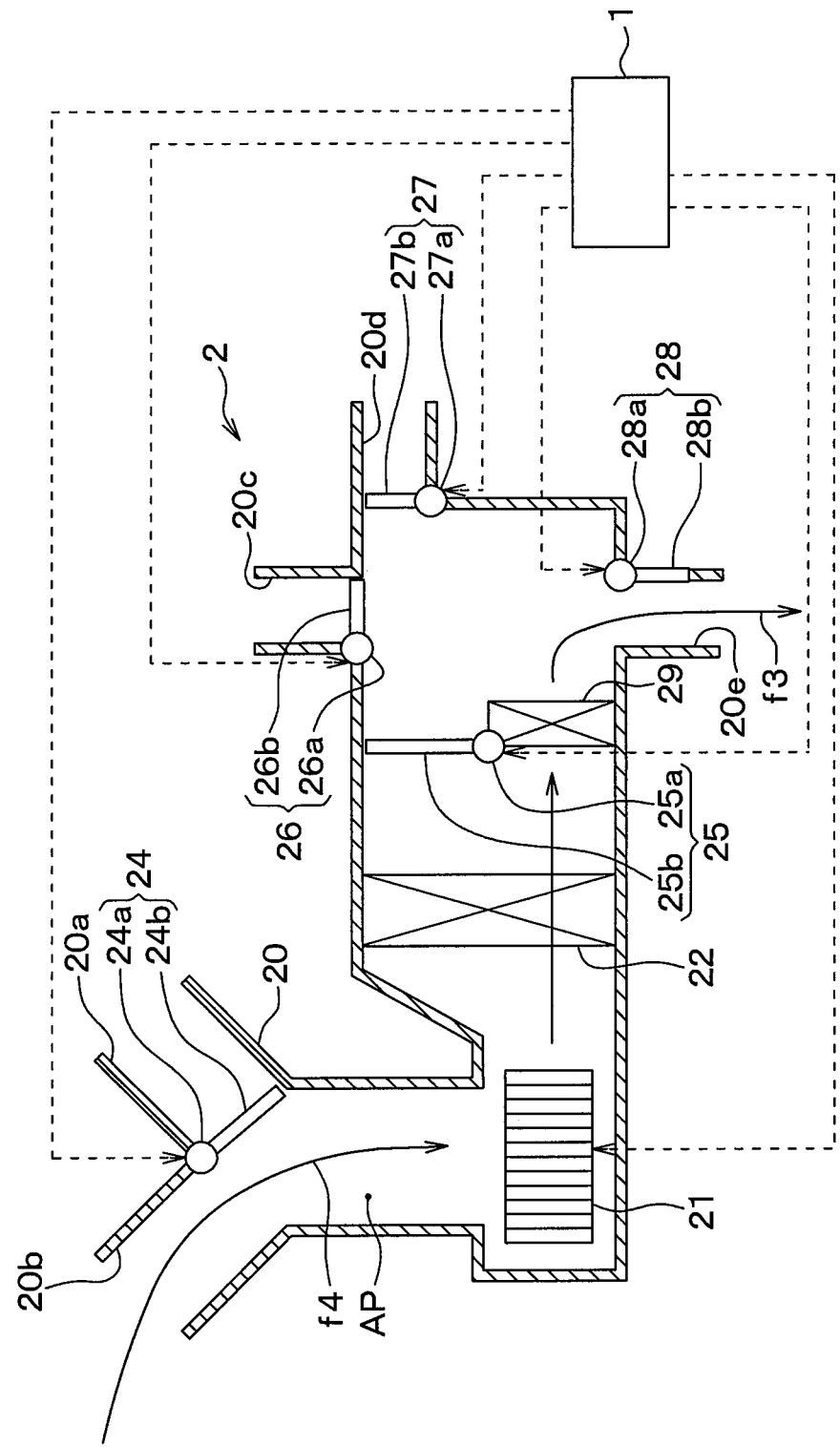
FIG. 19 is a schematic diagram showing another overall configuration of the vehicle air conditioner controlled by the vehicle control device according to the fourth embodiment.
Figure 22:
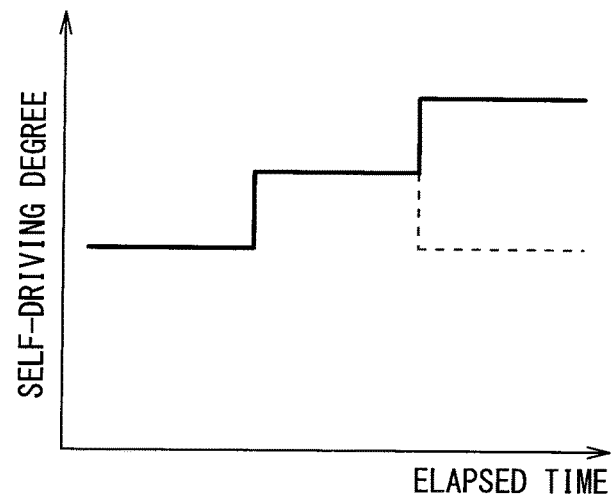
FIG. 22 is an illustrative diagram illustrating one example of a switching pattern of a self-driving degree.
Figure 23:
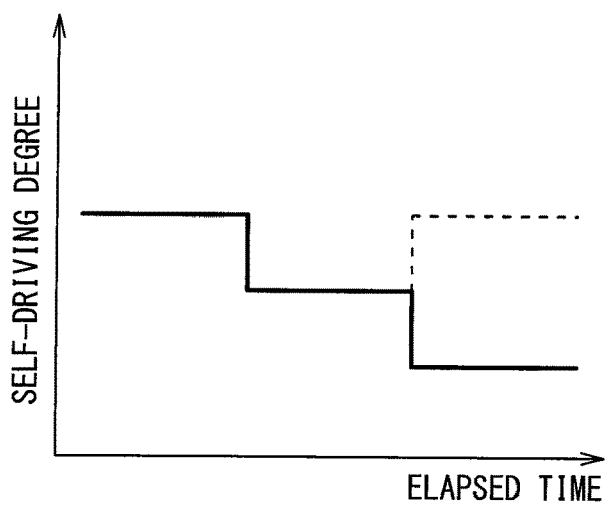
FIG. 23 is an illustrative diagram illustrating another example of the switching pattern of the self-driving degree.

As shown in FIGS. 18 and 19, a vehicle air conditioner 2 according to the present embodiment includes an electric heater 29 instead of the heater core 23. The electric heater 29 is provided inside a case 20, and is configured of a heating element that generates a heat by energization. The electric heater 29 is a heating device that heats the air (that is, cold air) that has passed through an evaporator 22. The electric heater 29 is disposed on a downstream side of an air flow of the evaporator 22 in an air passage AP.

A self-driving vehicle 100 can reduce fogging in a front windshield 100a by heating an air to be supplied to the front windshield 100a by the electric heater 29 to warm the front windshield 100a.

In the present modification, when the vehicle control device 1 has been changed to be set to a high self-driving degree, the same effects as those of the first embodiment can be obtained by controlling the amount of energization to be supplied to the electric heater 29 so as to reduce the anti-fogging function.

Specifically, the anti-fogging control unit 12 of the present modification executes the processing shown in FIG. 20 instead of the processing shown in FIG. 5. When the CPU of the vehicle control device 1 executes a program, the anti-fogging control unit 12 executes the processing of FIG. 20. Steps denoted by the same codes in the processing of FIG. 5 and the processing of FIG. 20 execute the same processing unless otherwise stated.

As shown in FIG. 20, when the anti-fogging control unit 12 determines in Step 205 that the self-driving degree is low, the anti-fogging control unit 12 proceeds to Step 210D. In Step 210D, the anti-fogging control unit 12 controls the vehicle air conditioner 2 so that the anti-fogging function is sufficiently high.

Specifically, in Step 210D, the anti-fogging control unit 12 increases the amount of energization to be supplied to the electric heater 29 so that a warm air is supplied to the vehicle interior. Further, as shown in FIG. 18, the anti-fogging control unit 12 controls the inside-outside air switching door 24 so that the position of the flat plate portion 24b becomes the outside air introduction position. As a result, the ratio of the inside air to the outside air is maximized, and a large amount of low-temperature and low-humidity outside air is introduced into the vehicle air conditioner 2.

Further, in Step 210D, the anti-fogging control unit 12 controls an air mixture door 25 so that the position of the flat plate portion 25b becomes the maximum heating position. As a result, the low-temperature and low-humidity outside air introduced into the vehicle air conditioner 2 is warmed by the electric heater 29 to produce high-temperature and low-humidity air conditioning wind.

Furthermore, in Step 210D, the anti-fogging control unit 12 controls a defroster door 26 and a foot door 28 so that an air is blown out from both of the defroster blowing port 20c and the foot blowing port 20e. As a result, the high temperature and low humidity air conditioning wind is blown toward the vehicle interior side surface of the front windshield 100a and the high-temperature and low-humidity conditioned air is blown out toward a space on a lower side of the vehicle interior.

On the other hand, when the anti-fogging control unit 12 determines in Step 205 that the self-driving degree is high, the anti-fogging control unit 12 proceeds to Step 220D. In Step 220D, the anti-fogging control unit 12 lowers the amount of energization to be supplied to the electric heater 29 to be lower than the amount of energization to be supplied to the electric heater 29 when the process of Step 210D is executed. In other words, the anti-fogging control unit 12 lowers the anti-fogging function by lowering the temperature of the electric heater 29 when the self-driving degree has been changed to be set to be high.

Further, in Step 220D, the anti-fogging control unit 12 controls the inside-outside air switching door 24 so that the position of a flat plate portion 24b becomes an inside air introduction position, as shown in FIG. 19. As a result, the ratio of the inside air and outside air becomes minimum, and the low-temperature and low-humidity outside air is less likely to be introduced into the vehicle air conditioner 2, and the high humidity inside air is likely to be introduced into the vehicle air conditioner 2.

Further, in Step 220D, the anti-fogging control unit 12 controls the air mixture door 25 so that the position of the flat plate portion 25b becomes a maximum heating position. In the present embodiment, since the inside air having a higher temperature than that of the outside air flows into the electric heater 29, the energy consumption amount of the electric heater 29 required for heating the air introduced into the vehicle air conditioner 2 is reduced.

Further, in Step 220D, the anti-fogging control unit 12 controls the defroster door 26 and the foot door 28 so that the air is blown out mainly from the foot blowing port 20e of the defroster blowing port 20c and the foot blowing port 20e. As a result, the air conditioning wind is not blown out toward the vehicle interior side surface of the front windshield 100a.

At this time, it is desirable that the anti-fogging control unit 12 controls the blower 21 so that the amount of air blown out from the foot blowing port 20e in Step 220D is maintained at the amount of air blown out from the foot blowing port 20e in Step 210D. As described above, if a blowing capacity of the blower 21 is lowered, the energy consumption amount of the blower 21 can be lowered. In addition, since the temperature of the air warmed by the electric heater 29 is less likely to be lowered as the blowing capacity of the blower 21 is lowered, the temperature drop of the air blown out from the foot blowing port 20e can be reduced. In the present embodiment, the anti-fogging control unit 12 of the vehicle control device 1 corresponds to an identification unit by executing Step 201, and corresponds to a control execution unit by executing Steps 205, 210D, 215, 220D, and 225.

As described above, in the present embodiment, when the self-driving degree is relatively high, the anti-fogging function is controlled to be lower than that when the self-driving degree is relatively low. For that reason, according to the vehicle control device 1 of the present embodiment, as in the first embodiment, various issues caused by the anti-fogging function are prevented from occurring.

In the present embodiment, an example has been described in which the vehicle control device 1 controls the anti-fogging function by changing the energization amount to the electric heater 29 and the positions of the inside-outside air switching door 24, the air mixture door 25, and the defroster door 26 in accordance with the self-driving degree, but the present disclosure is not limited to the above configuration. The vehicle control device 1 may be configured to control the anti-fogging function by, for example, changing the amount of energization to be supplied to the electric heater 29 in accordance with the self-driving degree and maintaining the positions of the inside-outside air switching door 24, the air mixture door 25, and the defroster door 26.

Further, in the present embodiment, an example in which only the electric heater 29 is disposed on the downstream side of the air flow of the evaporator 22 has been described, but the present disclosure is not limited to the above configuration. The vehicle air conditioner 2 may have a configuration in which, for example, the heater core 23 and the electric heater 29 are disposed on the downstream side of the air flow of the evaporator 22.

Fifth Embodiment

Hereinafter, a fifth embodiment will be described with reference to FIGS. 21 to 26. In the present embodiment, the functional configurations of the vehicle control device 1 and the control conditions of the defogging unit (that is, the vehicle air conditioner 2, and so on) according to the first embodiment are changed. Since the other portions are basically the same as in the first and third embodiments, only portions different from the first and third embodiments will be described.

As shown in FIG. 21, a vehicle control device 1 according to the present embodiment functions not only as a driving mode switching unit 11 and an anti-fogging control unit 12 but also as a communication unit 13 for communicating with the outside, and also as a self-driving prediction unit 14A. The self-driving prediction unit 14A according to the present embodiment is configured to be able to predict a time at which a switching control for changing a self-driving degree is performed based on a driving route searched by a route search system 4.

An automation level performed by a self-driving system tends to be switched according to a change of the road type. It is predicted that the automation level will be changed to a higher level, for example, after switching from a general road into which a pedestrian enters to a vehicle exclusive road, for example, an expressway. Further, when a lane dedicated to the self-driving vehicle 100 is provided on a vehicle exclusive road, it is predicted that the lane will be changed to a higher level when the lane is changed. In other words, as indicated by a solid line in FIG. 22, the automation level may be transitioned to rise step by step in accordance with a change in the road type. As indicated by a broken line in FIG. 22, the automation level may transition so as to temporarily rise and then fall in accordance with a change in the road type.

On the other hand, it is predicted that the automation level performed by the self-driving system is changed to a low level, for example, after switching from the vehicle exclusive road to the general road. Further, it is predicted that the automation level is changed to a lower level when, for example, the general road is switched from two lanes on one side to one lane on one side. In other words, as indicated by a solid line in FIG. 23, the automation level may transition so as to gradually decrease in accordance with the change of the road type. As indicated by a broken line in FIG. 23, the automation level may transition so as to rise after temporarily decreasing in accordance with a change in the road type.

Therefore, the self-driving prediction unit 14A according to the present embodiment is configured to estimate a time at which the switching control for changing the self-driving degree is performed based on the driving route searched by the route search system 4. Specifically, the self-driving prediction unit 14A is configured to estimate a driving degree decrease time Td at which the self-driving degree decreases with respect to the current self-driving degree based on the current location information and the traveling speed information identified by the route search system 4. Further, the self-driving prediction unit 14A is configured to estimate a driving degree increase time Ti at which the self-driving degree rises with respect to the current self-driving degree based on the current location information and the traveling speed information identified by the route search system 4. The self-driving prediction unit 14A is desirably configured to estimate a driving degree decrease time Td and the driving degree increase time Ti by taking into consideration not only the current location information and the traveling speed information but also a traffic congestion information on the driving route.

Figure 24:
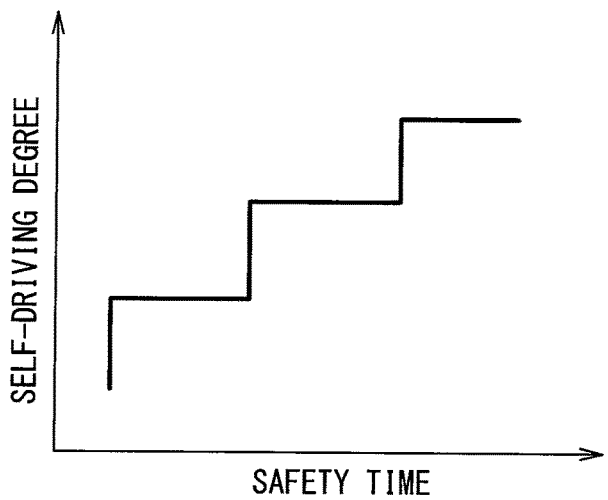
FIG. 24 is an illustrative diagram illustrating a relationship between the self-driving degree and a safety time.

Assuming that a time required to secure a visibility of the user or to prevent fogging on the front windshield 100a is a safety time Tsf, the safety time Tsf changes in accordance with the automation level. More specifically, as shown in FIG. 24, when the automation level is high, the safety function is enhanced as compared to when the automation level is low, so that the safety time Tsf is lengthened. When the automation level is high and the safety time Tsf is long, safety can be ensured even if the anti-fogging function is deteriorated. On the other hand, when the automation level is low and the safety time Tsf is short, there is a need to quickly improve the anti-fogging function to ensure safety.

Next, an example of processing to be executed by the self-driving prediction unit 14A according to the present embodiment will be described with reference to FIG. 25. When the CPU of the vehicle control device 1 executes a program, the self-driving prediction unit 14A executes the processing of FIG. 25. First, in Step 600, the self-driving prediction unit 14A predicts a timing at which the road type is changed in the driving route searched by the route search system 4 as the switching timing of the self-driving degree. At this time, the self-driving prediction unit 14A identifies whether a next switching of the self-driving degree increases the current self-driving degree or decreases the current self-driving degree.

Subsequently, in Step 610, the self-driving prediction unit 14A determines whether the next switching of the self-driving degree is an increase prediction or a decrease prediction. As a result, when the next switching of the self-driving degree becomes the increase prediction, the self-driving prediction unit 14A estimates the driving degree increase time Ti at which the next self-driving degree increases with respect to the current self-driving degree in Step 620.

Subsequently, in Step 630, the self-driving prediction unit 14A calculates a time at which the anti-fogging function is to be lowered. The self-driving prediction unit 14A according to the present embodiment calculates, for example, a time which is a predetermined first reference time ΔTi before the driving degree increase time Ti estimated in Step 620 as a time at which the anti-fogging function is lowered. As the first reference time ΔTi, for example, it is desirable to adopt a variable value which becomes longer when it is predicted that the switching of the self-driving degree one after another becomes higher than the self-driving degree of the next time. The first reference time ΔTi may be a fixed value instead of a variable value.

On the other hand, when the switching of the next self-driving degree is the decrease prediction, the self-driving prediction unit 14A estimates a driving degree decrease time Td at which the next self-driving degree decreases with respect to the current self-driving degree in Step 640.

Subsequently, in Step 650, the self-driving prediction unit 14A calculates a time at which the anti-fogging function is increased. The self-driving prediction unit 14A according to the present embodiment calculates, for example, a time which is a predetermined second reference time ΔTd before the driving degree decrease time Td estimated in Step 640 as a time for increasing the anti-fogging function. As the second reference time ΔTd, for example, it is desirable to adopt a variable value which becomes longer when it is predicted that the switching of the self-driving degree one after another becomes lower than the self-driving degree of the next time. The second reference time ΔTd may be a fixed value instead of a variable value.

Figure 26:
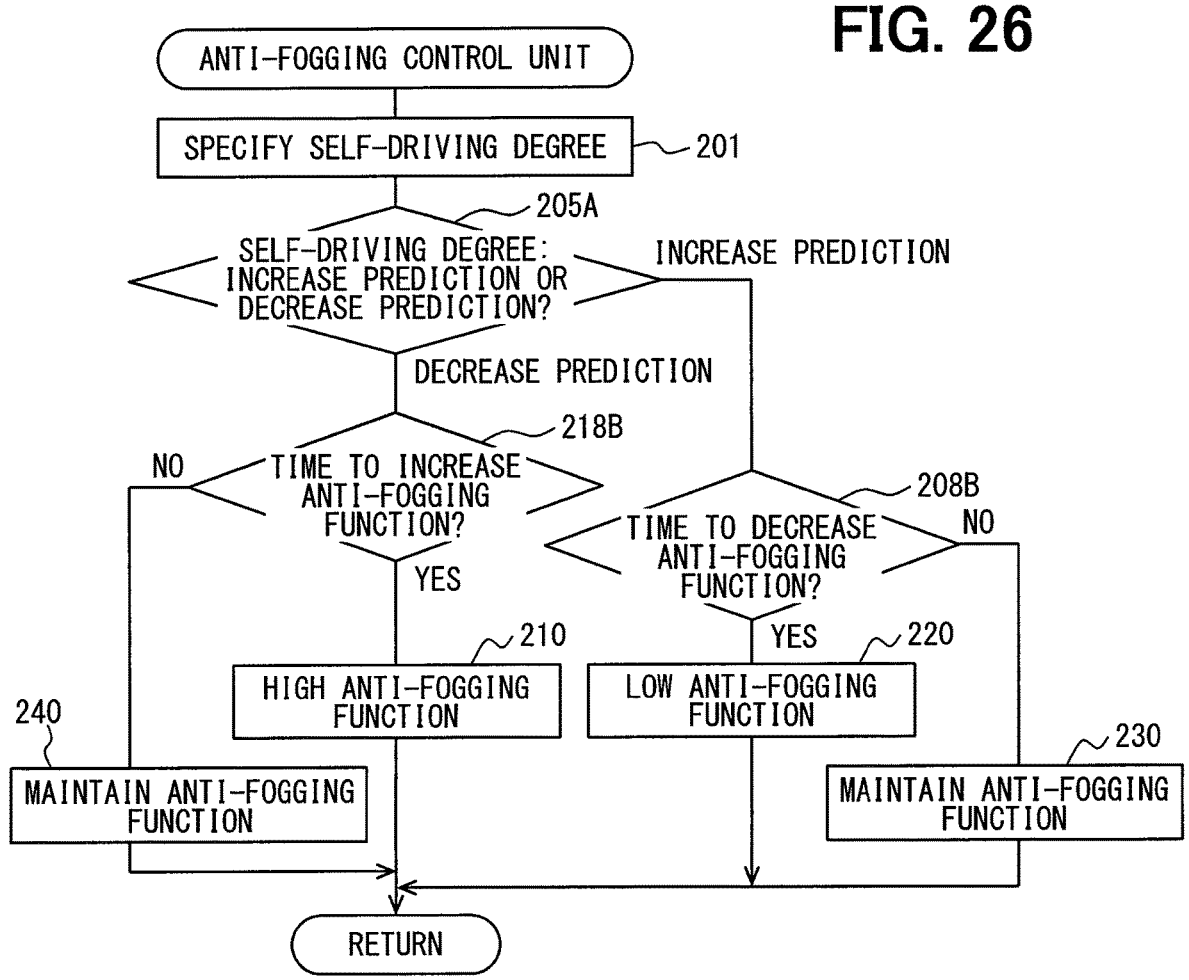
FIG. 26 is a flowchart of processing executed by an anti-fogging control unit according to the fifth embodiment.

Next, the anti-fogging control unit 12 according to the present embodiment executes the processing shown in FIG. 26 instead of the processing shown in FIG. 5. When the CPU of the vehicle control device 1 executes a program, the anti-fogging control unit 12 executes the processing of FIG. 26. Steps to which the same reference numerals are assigned in the processing of FIG. 5 and the processing of FIG. 26 execute the same processing unless otherwise stated.

As shown in FIG. 26, in Step 205A, the anti-fogging control unit 12 determines whether the next switching of self-driving degree is an increase prediction or a decrease prediction. As a result, when it is determined that the next switching of the self-driving degree is the increase prediction, the anti-fogging control unit 12 determines whether or not the current time reaches the time at which the anti-fogging function estimated by the self-driving prediction unit 14 A is lowered in Step 208B.

As a result, if the current time has reached the time at which the anti-fogging function is lowered, the anti-fogging control unit 12 proceeds to Step 220 and changes the anti-fogging function to be lowered. On the other hand, if the current time has not reached the time at which the anti-fogging function is lowered, the anti-fogging control unit 12 proceeds to Step 230 and maintains the anti-fogging function in the current state.

As described above, the vehicle control device 1 according to the present embodiment controls the defogging unit in advance so that the anti-fogging function is lowered before the switching control for increasing the self-driving degree is performed. This makes it possible to save the energy required for the anti-fogging function.

On the other hand, when the anti-fogging control unit 12 determines in Step 205A that the next self-driving degree is predicted to be lowered, the anti-fogging control unit 12 proceeds to Step 218B. In Step 218B, the anti-fogging control unit 12 determines whether or not the current time has reached the time at which the anti-fogging function calculated by the self-driving prediction unit 14A is lowered.

As a result, when the current time has reached the time at which the anti-fogging function is increased, the anti-fogging control unit 12 proceeds to Step 210 and changes the anti-fogging function to be high. On the other hand, if the current time has not reached the time at which the anti-fogging function is increased, the anti-fogging control unit 12 proceeds to Step 240 and maintains the anti-fogging function in the current state.

As described above, the vehicle control device 1 according to the present embodiment controls the defogging unit in advance so that the anti-fogging function becomes high in advance before the switching control for lowering the self-driving degree is performed. According to the above configuration, since an issue that the anti-fogging is not performed in time during driving by the driver is less likely to occur, the safety can be sufficiently ensured.

In this example, in the processing of FIG. 26, the rotation of an orientation of the front seat 100b is not specifically described, but the orientation of the front seat 100b may be rotated in accordance with the self-driving degree in the same manner as in the third embodiment or the like.

Figure 25:
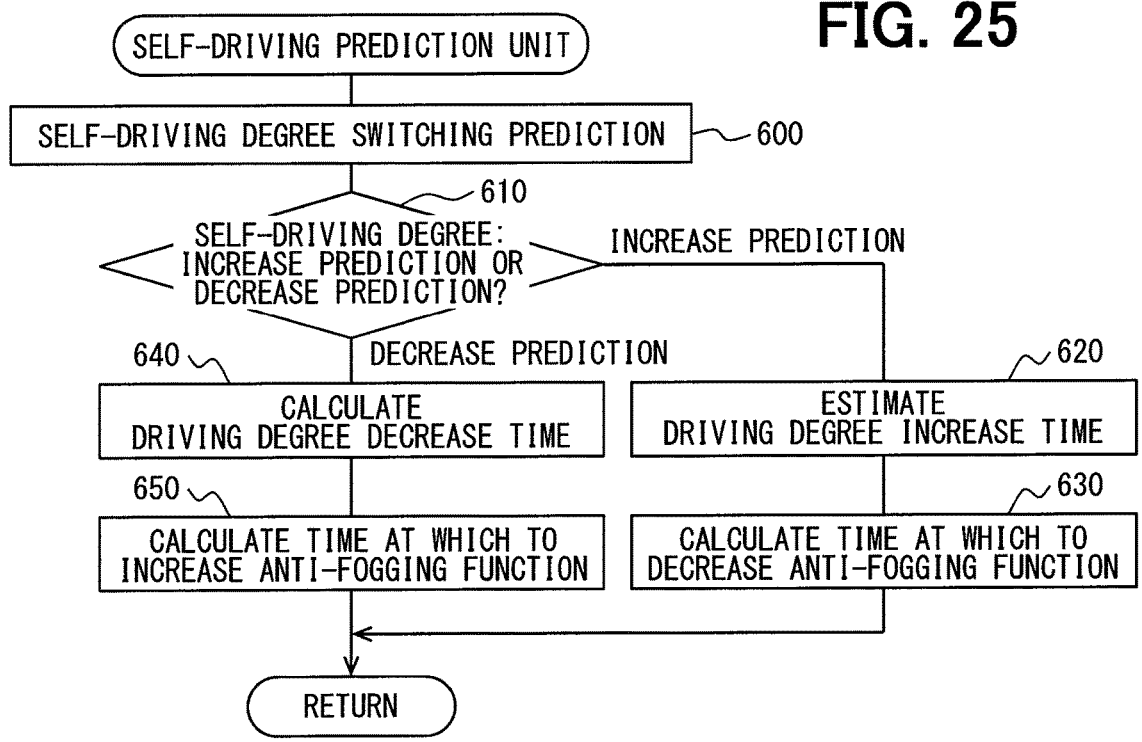
FIG. 25 is a flowchart of processing executed by the self-driving prediction unit according to the fifth embodiment.

The vehicle control device 1 according to the present embodiment has been described as an example in which the self-driving prediction unit 14 executes the processing of Step 600 shown in FIG. 25, but the present disclosure is not limited to the above configuration. When the route search system 4 can identify the processing of Step 600 shown in FIG. 25, the self-driving prediction unit 14 may be configured to execute the processing of Steps 610 to 650 shown in FIG. 25.

In the present embodiment, the anti-fogging control unit 12 of the vehicle control device 1 corresponds to an identification unit by executing Step 201, and corresponds to a control execution unit by executing Steps 205A, 208B, 210, 215, 218B, 220, 230, and 240.

Other Embodiments

The present disclosure is not limited to the embodiments described above, and can be changed as appropriate.

For example, in the first to third embodiments, when the automation level is any one of 0 to 3, the self-driving degree is set to the first value, and when the automation level is 4, the self-driving degree is set to the second value. However, both of the first value and the second value are not limited to the above configuration, and various definitions may be adopted. In other words, for example, when the automation level is any one of 0 to 2, the self-driving degree may be set to the first value, and when the automation level is 3 or 4, the self-driving degree may be set to the second value. Further, when the automation level is 0 or 1, the self-driving degree may be set to the first value, and when the automation level is any one of 2 to 4, the self-driving degree may be set to the second value. Further, when the automation level is 0, the self-driving degree may be set to the first value, and when the automation level is any one of 1 to 4, the self-driving degree may be set to the second value.

In the first and second embodiments, the automation levels defined by the Japanese authorities and NHTSA (National Highway Traffic Safety Administration) are employed as examples of the self-driving degree. However, the self-driving degree is not limited to the above example, and may be another degree as long as the degree depends on the driving operation in the self-driving system instead of the human. In other words, as the self-driving degree, for example, the automation level defined by SAE International (that is, levels 0 to 5) may be adopted, or other uniquely defined indices may be adopted. In those cases, various definitions may be adopted for both the first value and the second value.

As the index of the self-driving degree, for example, a case in which the operation of the driver is required only in an emergency although the operation of the driver is not usually required can be considered. Further, as the index of the self-driving degree, for example, a case in which the driver needs to always put his hand on the steering wheel, or a case in which the driver does not need to operate as long as he is traveling on the same lane, but the driver needs to operate when changing the lane can be considered.

Further, in the embodiments described above, the vehicle control device 1 may be configured to control the defogging unit such that when the self-driving degree reaches a third value higher than the second value, the anti-fogging function is lower than that when the self-driving degree reaches the second value.

In the same manner, a fourth value, a fifth value, and so on may be set. In other words, the vehicle control device 1 may be configured to control the defogging unit so that the anti-fogging function is lowered as the self-driving degree becomes a high value.

In the embodiments described above, the vehicle control device 1 may include a defogging unit. For example, the vehicle control device 1 may be configured to include the vehicle air conditioner 2 that configures the defogging unit.

Further, in the embodiments described above, the front seat 100b may be configured to be rotatable arbitrarily by the operation of the occupant or the like. In that case, it is desirable that the rotation of the front seat 100b by the operation of the occupant is prohibited during the manual driving by the driver.

The vehicle control device 1 of the embodiments described above has been described as being applied to the self-driving vehicle 100 in which the seat rotation device 3 is provided in the front seat 100b, but the present disclosure is not limited to the above configuration. The vehicle control device 1 is also applicable to, for example, the self-driving vehicle 100 in which the seat rotation device 3 is not provided in the front seat 100b.

According to a first aspect represented by a part or all of the embodiments, when the self-driving degree identified by the identification unit is a second value higher than a first value, the control execution unit controls the anti-fogging function executed by the defogging unit to be lower than that when the self-driving degree identified by the identification unit is the first value.

According to a second aspect, the defogging unit is an air conditioner in which an air is introduced to warm and the warmed air is supplied into a vehicle interior, and an inside/outside air ratio, which is a ratio of an outside air to an inside air in the air to be introduced, is variable. When the self-driving degree identified by identification unit is the second value, the control execution unit sets the inside/outside air ratio to be lower than that when the self-driving degree is the first value, to control the anti-fogging function exerted by the defogging unit to be lower than that in the case where the self-driving degree is the first value. Accordingly, the adjustment in the anti-fogging function using the inside/outside air ratio can be performed in accordance with the self-driving degree.

According to a third aspect, the defogging unit is an air conditioner in which an air is introduced to warm and the warmed air is supplied to a vehicle interior, and the amount of supply of the air to at least the window side in the vehicle interior is variable. When the self-driving degree identified by the identification unit is the second value, the control execution unit sets the amount of supply of the air to at least the window side in the vehicle interior to be smaller than that when the self-driving degree is the first value, to control the anti-fogging function exerted by the defogging unit to be lower than that when the self-driving degree is the first value. Accordingly, the adjustment in the anti-fogging function using the amount of supply of the air to at least the window side in the vehicle interior can be performed in accordance with the self-driving degree.

According to a fourth aspect, the defogging unit is an air conditioner in which an air outside the vehicle is introduced, and the introduced air is warmed to a predetermined temperature and the warmed air is supplied to a vehicle interior. The air conditioner includes a heating device for heating the air. When the self-driving degree identified by the identification unit is the second value, the control execution unit lowers the temperature of the heating device to set the predetermined temperature of the air supplied to at least the window side in the vehicle interior to be lower than that in the case where the self-driving degree is the first value, to control the anti-fogging function exerted by the defogging unit to be lower than that when the self-driving degree is the first value. Accordingly, the adjustment in the anti-fogging function using the temperature of the warmed air supplied to the window side in the vehicle interior can be performed in accordance with the self-driving degree.

According to a fifth aspect, the defogging unit is an air conditioner that dehumidifies an air by cooling the air introduced from an outside of the vehicle. When the self-driving degree identified by the identification unit is the second value, the control execution unit lowers a dehumidification capacity of the defogging unit than that when the self-driving degree is the first value, to control the anti-fogging function exerted by the defogging unit to be lower than that when the self-driving degree is the first value. Accordingly, the adjustment in the anti-fogging function using the humidification capacity can be performed in accordance with the self-driving degree.

According to a sixth aspect, the defogging unit is an electric heating member that is mounted on the vehicle to generate heat by energization and supply the heat generated by energization to the window. When the self-driving degree identified by the identification unit is the second value, the control execution unit lowers an amount of energization to the electric heating member than that when the self-driving degree is the first value, to control the anti-fogging function exerted by the defogging unit to be lower than that when the self-driving degree is the first value. Accordingly, the adjustment in the anti-fogging function using the heating capacity can be performed in accordance with the self-driving degree.

According to a seventh aspect, the control execution unit increases the anti-fogging function before the self-driving degree becomes low when detecting a predetermined sign that the self-driving degree becomes low.

Accordingly, the anti-fogging function is exerted in advance to timely defog when the driver starts driving, to secure the safety.

According to an eighth aspect, during driving in a predicted section in which the self-driving degree is predicted to be the second value among driving routes searched by a route search system, the control execution unit increases the anti-fogging function before reaching an end point of the prediction section in which the self-driving degree is predicted to be lowered. Accordingly, before the self-driving degree becomes low, the anti-fogging function is raised in advance to timely defog when the driver starts driving, to secure the safety.

According to a ninth aspect, the control execution unit increases the anti-fogging function at a time before a predicted arrival time at which the vehicle reaches the end point of the prediction section by a required anti-fogging time required to prevent fogging of the window. Accordingly, the fogging on the window can be sufficiently restricted when the driver drives the vehicle.

According to a tenth aspect, the control execution unit lowers the anti-fogging function before the self-driving degree increases when detecting a predetermined sign that the self-driving degree increases.

Accordingly, the energy needed for the defogging can be further saved by decreasing the anti-fogging function in advance.

According to an eleventh aspect, during traveling in a section in which the self-driving degree is lower than the second value among driving routes searched by a route search system, the control execution unit lowers the anti-fogging function a predetermined time before reaching a start point of a prediction section in which the self-driving degree is predicted to be the second value. Accordingly, the energy needed for the defogging can be further saved by decreasing the anti-fogging function in advance, before the self-driving degree becomes high.

According to a twelfth aspect, the control device further includes: a self-driving degree estimation unit that estimates a driving degree decrease time at which the self-driving degree lowers with respect to a current self-driving degree based on a route search system. The control execution unit increases the anti-fogging function before the driving degree decrease time. Accordingly, before the self-driving degree becomes low, the anti-fogging function is raised in advance to timely defog when the driver starts driving, to secure the safety.

According to a thirteenth aspect, the control device further includes: a self-driving degree estimation unit that estimates a driving degree increase time at which the self-driving degree increases with respect to a current self-driving degree based on a route search system. The control execution unit lowers the anti-fogging function before the driving degree increase time. Accordingly, the energy needed for the defogging can be further saved by decreasing the anti-fogging function in advance, before the self-driving degree becomes high.

According to a fourteenth aspect, a plurality of seats are installed in a vehicle interior. A foremost seat disposed at a foremost in a front-rear direction of the vehicle among the plurality of seats is configured to be rotatable about an up-down direction of the vehicle as an axis. The control execution unit rotates the foremost seat when the self-driving degree changes. Accordingly, the orientation of the foremost seat can be changed in accordance with the adjustment in the anti-fogging function.

According to a fifteenth aspect, the control execution unit rotates the foremost seat to cause an occupant seated in the foremost seat faces a rear side in the front-rear direction when the self-driving degree changes from the first value to the second value.

Accordingly, an occupant seated on the foremost seat can be restricted from feeling unpleasant by seeing the fogged window.

According to a sixteenth aspect represented by a part of all of the embodiments, a non-transitory computer-readable medium storing instructions executable by a computer to perform a program that causes the vehicle control device to function as the control execution unit, such that advantages similar to the first aspect can be obtained.

What is claimed is:

1. A device for controlling a defogging unit of a vehicle configured to be driven in a driving mode corresponding to a self-driving degree indicating a degree of depending on a self-driving system for a driving operation, the defogging unit exhibiting an anti-fogging function of a window of the vehicle, the device comprising:
a processor configured to, by executing a program stored in a non-transitory storage medium,
identify the self-driving degree from the sensor; and
control the anti-fogging function exhibited by the defogging unit, wherein
the self-driving degree is defined as exhibiting a higher value as the degree of depending on the self-driving system for the driving operation is larger,
when the self-driving degree is a second value higher than a first value, the processor is configured to control the anti-fogging function to be lower than that when the self-driving degree is the first value, and
the processor is configured to increase the anti-fogging function before the self-driving degree becomes low when detecting a predetermined sign that the self-driving degree becomes low.

2. The device according to claim 1, wherein
the defogging unit is an air conditioner into which an inside air and an outside air are introduced, and an inside/outside air ratio, which is a ratio of the outside air to the inside air in the air to be introduced, is variable, and
when the self-driving degree is the second value, the processor is configured to set the inside/outside air ratio to be lower than that when the self-driving degree is the first value.

3. The device according to claim 1, wherein
the defogging unit is an air conditioner into which an inside air and an outside air are introduced, and the amount of supply of the inside air and the outside air to at least the window side in the vehicle interior is variable, and
when the self-driving degree is the second value, the processor is configured to set the amount of supply of the inside air and outside air to at least the window side in the vehicle interior to be smaller than that when the self-driving degree is the first value.

4. The device according to claim 1, wherein
the defogging unit is an air conditioner in which an air outside the vehicle is introduced, the introduced air is set to a predetermined temperature and supplied to a vehicle interior,
the air conditioner includes a heating device for heating the air, and
when the self-driving degree is the second value, the processor is configured to lower the temperature of the heating device to set the predetermined temperature of the air supplied to at least the window side in the vehicle interior to be lower than that in the case where the self-driving degree is the first value.

5. The device according to claim 1, wherein
the defogging unit is an air conditioner that dehumidifies an air by cooling the air introduced from an outside of the vehicle, and
when the self-driving degree is the second value, the processor is configured to lower a dehumidification capacity of the defogging unit than that when the self-driving degree is the first value.

6. The device according to claim 1, wherein
the defogging unit is an electric heating member that is mounted on the vehicle to generate heat by energization and supply the heat generated by energization to the window, and
when the self-driving degree is the second value, the processor is configured to lower an amount of energization to the electric heating member than that when the self-driving degree is the first value.

7. The device according to claim 1, wherein
a plurality of seats are installed in a vehicle interior,
a foremost seat disposed at a foremost in a front-rear direction of the vehicle among the plurality of seats is configured to be rotatable about an up-down direction of the vehicle as an axis, and
the processor is configured to rotate the foremost seat when the self-driving degree changes.

8. The device according to claim 7, wherein the processor is configured to rotate the foremost seat to cause an occupant seated in the foremost seat to face a rear side in the front-rear direction when the self-driving degree changes from the first value to the second value.

9. A device for controlling a defogging unit of a vehicle configured to be driven in a driving mode corresponding to a self-driving degree indicating a degree of depending on a self-driving system for a driving operation, the defogging unit exhibiting an anti-fogging function of a window of the vehicle, the device comprising:
a processor configured to, by executing a program stored in a non-transitory storage medium,
identify the self-driving degree from a sensor; and
control the anti-fogging function exhibited by the defogging unit, wherein
the self-driving degree is defined as exhibiting a higher value as the degree of depending on the self-driving system for the driving operation is larger,
when the self-driving degree is a second value higher than a first value, the processor is configured to control the anti-fogging function to be lower than that when the self-driving degree is the first value, and
during driving in a predicted section in which the self-driving degree is predicted to be the second value among driving routes searched by a route search system, the processor is configured to increase the anti-fogging function before reaching an end point of the prediction section in which the self-driving degree is predicted to be lowered.

10. The device according to claim 9, wherein
the processor is configured to increase the anti-fogging function at a time before a predicted arrival time at which the vehicle reaches the end point of the prediction section by a required anti-fogging time required to prevent fogging of the window.

11. A device for controlling a defogging unit of a vehicle configured to be driven in a driving mode corresponding to a self-driving degree indication a degree of depending on a self-driving system for a driving operation, the defogging unit exhibiting an anti-fogging function of a window of the vehicle, the device comprising:
    a processor configured to, by executing a program stored in a on-transitory storage medium,
    identify the self-driving degree from a sensor; and
    control the anti-fogging function exhibited by the defogging unit, wherein
    the self-driving degree is defined as exhibiting a higher value as the degree of depending on the self-driving system for the driving operation is larger,
    when the self-driving degree is a second value higher than a first value, the processor is configured to control the anti-fogging function to be lower than that when the self-driving degree is the first value, and
    the processor is configured to lower the anti-fogging function before the self-driving degree increases when detecting a predetermined sign that the self-driving degree increases.

12. A device for controlling a defogging unit of a vehicle configured to be driven in a driving mode corresponding to a self-driving degree indicating a degree of depending on a self-driving system for a driving operation, the defogging unit exhibiting an anti-fogging function of a window of the vehicle, the device comprising:
    a processor configured to, by executing a program stored in a non-transitory storage medium,
    identify the self-driving degree from a sensor; and
    control the anti-fogging function exhibited by the defogging unit, wherein
    the self-driving degree is defined as exhibiting a higher value as the degree of depending on the self-driving system for the driving operation is larger,
    when the self-driving degree is a second value higher than a first value, the processor is configured to control the anti-fogging function to be lower than that when the self-driving degree is the first value, and
    during traveling in a section in which the self-driving degree is lower than second value among driving routes searched by a route search system, the processor is configured to lower the anti-fogging function a predetermined time before reaching a start point of a prediction section in which the self-driving degree is predicted to be the second value.

13. A device for controlling a defogging unit of a vehicle configured to be driven in a driving mode corresponding to a self-driving degree indicating a degree of depending on a self-driving system for a driving operation, the defogging unit exhibiting an anti-fogging function of a window of the vehicle, the device comprising:
    a processor configured to, by executing a program stored in a non-transitory storage medium,
    identify the self-driving degree from a sensor;
    control the anti-fogging function exhibited by the defogging unit, and
    estimate a decrease time at which the self-driving degree lowers with respect to a current self-driving degree based on a route search system, wherein
    the self-driving degree is defined as exhibiting a higher value as the degree of depending on the self-driving system for the driving operation is larger,
    when the self-driving degree is a second value higher than a first value, the processor is configured to control the anti-fogging function to be lower than that when the self-driving degree is the first value, and
    the processor is configured to increase the anti-fogging function before the decrease time.

14. A device for controlling a defogging unit of a vehicle configured to be driven in a driving mode corresponding to a self-driving degree indicating a degree of depending on a self-driving system for a driving operation, the defogging unit exhibiting an anti-fogging function of a window of the vehicle, the device comprising:
    a processor configured to, by executing a program stored in a non-transitory storage medium,
    identify the self-driving degree from a sensor;
    control the anti-fogging function exhibited by the defogging unit, and
    estimate an increase time at which the self-driving degree increases with respect to a current self-driving degree based on a route search system, wherein
    the self-driving degree is defined as exhibiting a higher value as the degree of depending on the self-driving system for the driving operation is larger,
    when the self-driving degree is a second value higher than a first value, the processor is configured to control the anti-fogging function to be lower than that when the self-driving degree is the first value, and
    the processor is configured to lower the anti-fogging function before the increase time.

\* \* \* \* \*